United States Patent
Mizusawa et al.

(10) Patent No.: US 10,863,095 B2
(45) Date of Patent: Dec. 8, 2020

(54) IMAGING APPARATUS, IMAGING METHOD, AND IMAGING PROGRAM

(71) Applicant: FUJIFILM Corporation, Tokyo (JP)

(72) Inventors: Tetsuya Mizusawa, Saitama (JP); Kenji Makino, Saitama (JP); Daisuke Hayashi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/570,285

(22) Filed: Sep. 13, 2019

(65) Prior Publication Data
US 2020/0007771 A1 Jan. 2, 2020

Related U.S. Application Data

(63) Continuation of application No. PCT/JP2018/006048, filed on Feb. 20, 2018.

(30) Foreign Application Priority Data

Mar. 15, 2017 (JP) ................. 2017-050270

(51) Int. Cl.
H04N 5/232 (2006.01)
G02B 27/64 (2006.01)

(52) U.S. Cl.
CPC ....... H04N 5/23287 (2013.01); G02B 27/646 (2013.01); H04N 5/232125 (2018.08); H04N 5/232133 (2018.08)

(58) Field of Classification Search
CPC ......... H04N 5/23287; H04N 5/232125; H04N 5/232133; G02B 27/646
(Continued)

(56) References Cited

U.S. PATENT DOCUMENTS 8,416,338 B2*  4/2013  Nagasaka ............ H04N 5/2356
                                                348/348
8,711,272 B2*  4/2014  Noto .................. H04N 5/23287
                                                348/345
(Continued)

FOREIGN PATENT DOCUMENTS

CN    101339349 A    1/2009
CN    101750846 A    6/2010
(Continued)

OTHER PUBLICATIONS

International Preliminary Report on Patentability and Written Opinion of the International Search Report (Form PCT/IPEA/409) for International Application No. PCT/JP2018/006048, dated Jul. 31, 2018, with English translation.
(Continued)

*Primary Examiner* — Pritham D Prabhakher
(74) *Attorney, Agent, or Firm* — Birch, Stewart, Kolasch & Birch, LLP

(57) ABSTRACT

An imaging apparatus includes: an imager that performs imaging of a subject through an imaging optical system including a focus lens capable of changing a position of a principal point in a range between a first position and a second position in a direction of an optical axis; and an imaging controller that continuously performs plural imaging control operations for causing the imager to perform imaging of the subject through the imaging optical system in a state where the principal point of the focus lens is set at each of plural imaging positions which are set in a movement range as at least a partial range of the range, and the imaging controller makes distances between the plural imaging positions narrower and sets a larger number of the plural imaging positions in an imaging control operation per-
(Continued)

formed later in time series among the plural imaging control operations.

21 Claims, 12 Drawing Sheets

(58) Field of Classification Search
USPC .................................................. 348/208.11
See application file for complete search history.

(56) References Cited

U.S. PATENT DOCUMENTS

| | | | | |
|---|---|---|---|---|
| 8,724,982 | B2* | 5/2014 | Ishiwata | G02B 7/38 |
| | | | | 396/104 |
| 8,823,814 | B2* | 9/2014 | Tsuchida | H04N 5/23274 |
| | | | | 348/208.99 |
| 9,581,436 | B2* | 2/2017 | Ishihara | G01B 11/22 |
| 9,854,151 | B2* | 12/2017 | Endo | G02B 7/09 |
| 9,924,089 | B2* | 3/2018 | Nakagawa | H04N 5/2356 |
| 10,277,795 | B2* | 4/2019 | Mikawa | H04N 5/232133 |
| 2008/0031611 | A1 | 2/2008 | Konishi | |
| 2009/0009651 | A1 | 1/2009 | Takayanagi | |
| 2010/0128163 | A1 | 5/2010 | Nagasaka et al. | |
| 2010/0157134 | A1 | 6/2010 | Kawarada | |
| 2011/0043681 | A1 | 2/2011 | Shibagami | |
| 2011/0273471 | A1 | 11/2011 | Nagasaka et al. | |
| 2011/0293256 | A1* | 12/2011 | Ishiwata | G03B 3/10 |
| | | | | 396/104 |
| 2012/0038783 | A1* | 2/2012 | Noto | G02B 27/646 |
| | | | | 348/208.2 |
| 2012/0236122 | A1 | 9/2012 | Fukawa | |
| 2014/0192216 | A1 | 7/2014 | Matsumoto | |
| 2014/0267831 | A1 | 9/2014 | Uchiyama | |
| 2015/0092992 | A1* | 4/2015 | Ishihara | G06K 9/4652 |
| | | | | 382/106 |
| 2016/0021299 | A1 | 1/2016 | Endo | |
| 2016/0212324 | A1* | 7/2016 | Endo | H04N 9/04557 |
| 2016/0234426 | A1* | 8/2016 | Nakagawa | H04N 5/23293 |
| 2016/0316134 | A1 | 10/2016 | Mikawa | |
| 2017/0214907 | A1* | 7/2017 | Lapstun | G02B 30/27 |

FOREIGN PATENT DOCUMENTS

| | | |
|---|---|---|
| CN | 101995733 A | 3/2011 |
| CN | 102103321 A | 6/2011 |
| CN | 102262332 A | 11/2011 |
| CN | 102523383 A | 6/2012 |
| CN | 102535382 A | 9/2012 |
| CN | 103888659 A | 6/2014 |
| CN | 104049437 A | 9/2014 |
| CN | 105074528 A | 11/2015 |
| EP | 2007135 A2 | 12/2008 |
| JP | 2006-217249 A | 8/2006 |
| JP | 2006-308813 A | 11/2006 |
| JP | 2007-166155 A | 6/2007 |
| JP | 2008-26619 A | 2/2008 |
| JP | 2010-128018 A | 6/2010 |
| JP | 2010-166519 A | 7/2010 |
| JP | 2011-128422 A | 6/2011 |
| JP | 2012-103722 A | 5/2012 |
| JP | 2015-156552 A | 8/2015 |
| JP | 2016-114720 A | 6/2016 |
| JP | 2016-161759 A | 9/2016 |
| JP | 2016-208268 A | 12/2016 |

OTHER PUBLICATIONS

International Search Report (Form PCT/ISA/210) for International Application No. PCT/JP2018/006048, dated Apr. 24, 2018, with English translation.
Japanese Office Action for corresponding Japanese Apptication No. 2019-505807, dated Jun. 11, 2019, with English translation.
Chinese Office Action and Search Report, dated Jul. 16, 2020, for corresponding Chinese Application No. 201880017821.2, with Engiish translations.

* cited by examiner

IMAGING APPARATUS, IMAGING METHOD, AND IMAGING PROGRAM

CROSS REFERENCE TO RELATED APPLICATION

This is a continuation of International Application No. PCT/JP2018/006048 filed on Feb. 20, 2018, and claims priority from Japanese Patent Application No. 2017-050270 filed on Mar. 15, 2017, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

Recently, there has been a rapid increase in the demand for information devices having imaging functions such as digital still cameras, digital video cameras, mobile phones including a smartphone and the like, or tablet terminals in accordance with an increase in resolution of imaging elements such as charge coupled device (CCD) image sensors and complementary metal oxide semiconductor (CMOS) image sensors. It should be noted that information devices having the above-mentioned imaging functions are referred to as imaging apparatuses.

Some of the imaging apparatuses each have a focus bracketing mode as an imaging mode.

The focus bracketing mode is a function that is capable of generating a captured image in which the entirety of a main subject is in focus by performing imaging in a state where the focus lens is at each imaging position while the focus lens is continuously moved within a predetermined range and by storing captured image data obtained by each imaging.

JP2010-128018A and JP2016-208268A each describe an imaging apparatus that variably controls a movement distance of a focus lens during a period in which continuous imaging is performed in the focus bracketing mode.

JP2012-103722A describes an imaging apparatus that determines in advance a movement distance of a focus lens in a focus bracketing mode on the basis of a focusing evaluation value obtained by a contrast auto focus (AF) method.

SUMMARY OF THE INVENTION

The focus bracketing mode is mostly used in a case of imaging, for example, an insect or a flower as a main subject to be brought into focus.

However, in a case where an insect as a main subject starts moving or a flower as a main subject shakes significantly due to wind during a period in which continuous imaging is performed in the focus bracketing mode, imaging fails and imaging needs to be performed again.

In the case of imaging an insect, the insect may start moving and run away somewhere, and then it is impossible to perform imaging of the insect again.

In a case of shortening the time during which continuous imaging is performed by reducing the number of imaging operations at the time of continuous imaging as much as possible, it is possible to increase the probability that the continuous imaging ends before the main subject moves (before the insect runs away). However, in a case where the number of imaging operations decreases, the sense of resolution of the main subject may not be sufficiently obtained.

Although it is effective to increase the number of imaging operations in order to obtain a sufficient sense of resolution, the increase in number of imaging operations means that the time until the continuous imaging ends increases. Therefore, since the main subject is highly likely to move during continuous imaging, there is a risk of imaging failure.

JP2010-128018A, JP2016-208268A, and JP2012-103722A do not take into consideration the risk of imaging failure in a case where the main subject moves before the end of the continuous imaging.

The present invention has been made in consideration of the above-mentioned situations, and a subject thereof is to provide an imaging apparatus, an imaging method, and an imaging program capable of reducing the possibility of imaging failure in the focus bracketing mode.

An imaging apparatus of the present invention comprises: an imager that performs imaging of a subject through an imaging optical system including a focus lens capable of changing a position of a principal point in a range between a first position and a second position in a direction of an optical axis; and an imaging controller that continuously performs a plurality of imaging control operations for causing the imager to perform imaging of the subject through the imaging optical system in a state where the principal point of the focus lens is set at each of a plurality of imaging positions which are set in a movement range as at least a partial range of the range. The imaging controller makes distances between the plurality of imaging positions narrower in an imaging control operation performed later in time series among the plurality of imaging control operations.

An imaging method of the present invention uses an imager that performs imaging of a subject through an imaging optical system including a focus lens capable of changing a position of a principal point in a range between a first position and a second position in a direction of an optical axis. The imaging method comprises an imaging control step of continuously performing a plurality of imaging control operations for causing the imager to perform imaging of the subject through the imaging optical system in a state where the principal point of the focus lens is set at each of a plurality of imaging positions which are set in a movement range as at least a partial range of the range. In the imaging control step, distances between the plurality of imaging positions are made to be narrower in an imaging control operation performed later in time series among the plurality of imaging control operations.

An imaging program of the present invention causes a computer to execute an imaging method using an imager that performs imaging of a subject through an imaging optical system including a focus lens capable of changing a position of a principal point in a range between a first position and a second position in a direction of an optical axis. The imaging method includes an imaging control step of continuously performing a plurality of imaging control operations for causing the imager to perform imaging of the subject through the imaging optical system in a state where the principal point of the focus lens is set at each of a plurality of imaging positions which are set in a movement range as at least a partial range of the range. In addition, it is preferable that in the imaging control step, distances between the plurality of imaging positions are made to be narrower in an imaging control operation performed later in time series among the plurality of imaging control operations.

According to the present invention, it is possible to provide an imaging apparatus, an imaging method, and an imaging program capable of reducing the possibility of imaging failure in the focus bracketing mode.

DESCRIPTION OF THE PREFERRED EMBODIMENTS

Hereinafter, embodiments of the present invention will be described with reference to the drawings.

Figure 1:
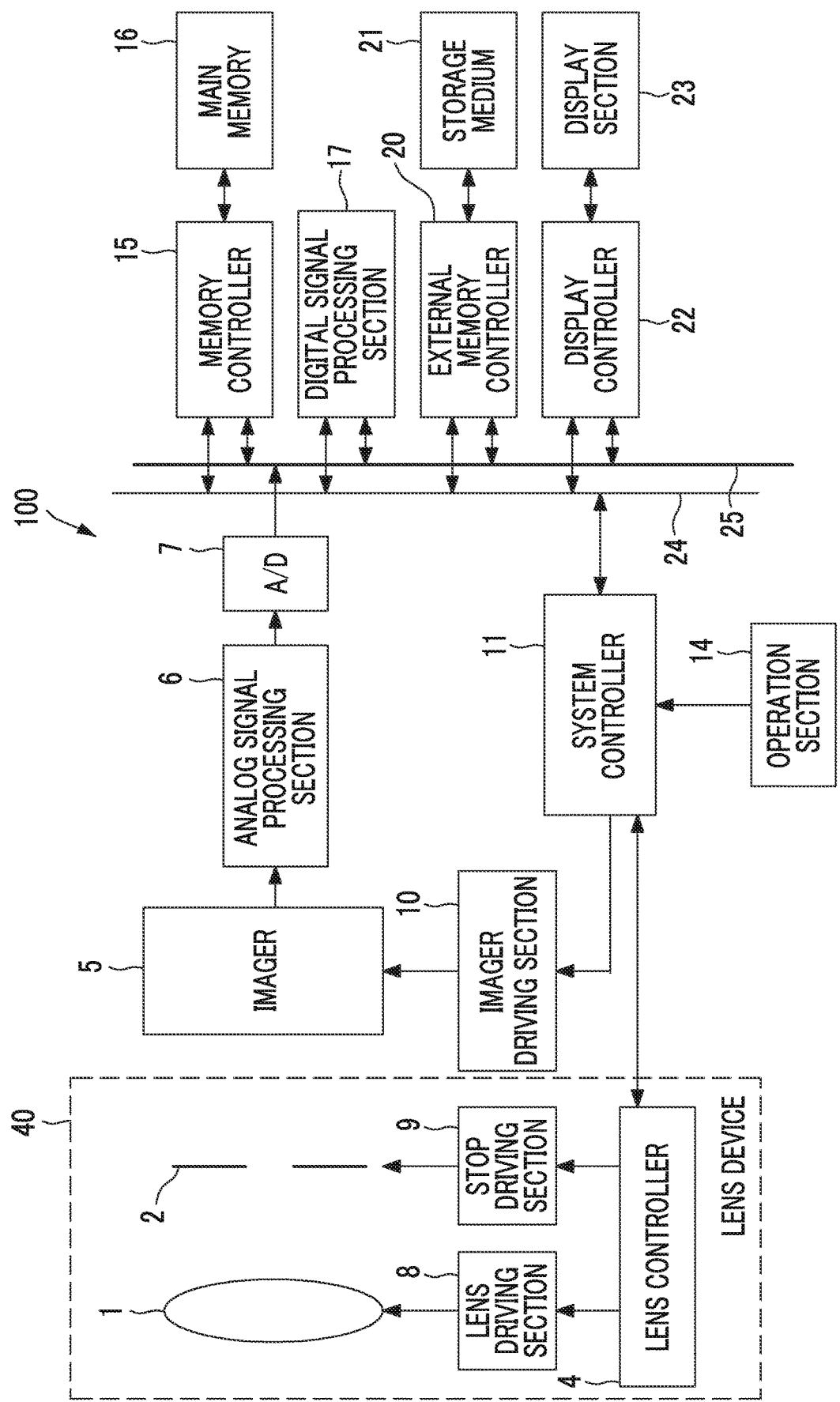
FIG. 1 is a diagram illustrating a schematic configuration of a digital camera 100 which is an embodiment of an imaging apparatus of the present invention.

FIG. 1 is a diagram illustrating a schematic configuration of a digital camera 100 which is an embodiment of an imaging apparatus of the present invention.

The digital camera illustrated in FIG. 1 comprises a lens device 40 having an imaging lens 1, a stop 2, a lens controller 4, a lens driving section 8, and a stop driving section 9.

The lens device 40 may be attachable to and detachable from the digital camera 100 or may be integrated with the digital camera 100.

The imaging lens 1 and the stop 2 compose an imaging optical system, and the imaging optical system includes at least a focus lens movable in the direction of the optical axis.

This focus lens is a lens for adjusting the focus of the imaging optical system, and is composed of a single lens or a plurality of lenses. By moving the focus lens in the direction of the optical axis, the position of the principal point of the focus lens is changed along the direction of the optical axis, and the focal position on the subject side is changed.

The focus lens is able to change the position of the principal point in a range (hereinafter referred to as a movable range) between the first position and the second position in the direction of the optical axis. The first position is a position closer to the subject side than the second position.

As the focus lens, a liquid lens, which is able to change the position of the principal point in the direction of the optical axis in the range between the first position and the second position by electrical control, may be used.

The lens controller 4 of the lens device 40 is configured to be capable of communicating with a system controller 11 of the digital camera 100 through wire or wireless.

The lens controller 4 changes the position of the principal point of the focus lens by driving the focus lens included in the imaging lens 1 through the lens driving section 8 in accordance with a command issued from the system controller 11, or controls an opening amount of the stop 2 through the stop driving section 9.

The digital camera 100 further comprises: an imager 5 such as a CCD image sensor or a CMOS image sensor that images a subject through an imaging optical system; an analog signal processing section 6 that performs analog signal processing such as correlated double sampling processing connected to an output of the imager 5; and an analog digital conversion circuit 7 that converts an analog signal, which is output from the analog signal processing section 6, into a digital signal.

The system controller 11 controls the analog signal processing section 6 and the analog digital conversion circuit 7.

The imager 5 has an imaging surface in which a plurality of pixels are two-dimensionally arranged, and the plurality of pixels converts a subject image, which is formed on the imaging surface by the imaging optical system, into an electric signal (pixel signal), and outputs the signal. Hereinafter, a set of pixel signals, which are output from each pixel of the imager 5, is referred to as a captured image signal.

The system controller 11, which integrally controls the entire electric control system of the digital camera 100, outputs a subject image captured through the imaging optical system of the lens device 40, as a captured image signal, by driving the imager 5 through the imager driving section 10.

An instruction signal from a user is input to the system controller 11 through the operation section 14.

The system controller 11 integrally controls the entire digital camera 100, and the hardware structure is various processors that execute programs including an imaging program to perform processing.

Various kinds of processors include a programmable logic device (PLD) that is a processor capable of changing a circuit configuration after manufacturing of a central processing unit (CPU), a field programmable gate array (FPGA), or the like as a general-purpose processor that performs various kinds of processing by executing programs, a dedicated electric circuit that is a processor having a circuit configuration designed exclusively for executing specific processing of an application specific integrated circuit (ASIC) or the like, and the like.

More specifically, a structure of these various processors is an electric circuit in which circuit elements such as semiconductor elements are combined.

The system controller 11 may be configured as one of various processors, or may be configured as a combination of two or more of the same or different kinds of processors (for example, a combination of a plurality of FPGAs or a combination of a CPU and an FPGA).

Further, the electric control system of the digital camera 100 comprises: a main memory 16 composed of a random access memory (RAM); a memory controller 15 that performs control for storing data in the main memory 16 and reading the data from the main memory 16; a digital signal processing section 17 that performs digital signal processing on the captured image signal output from the analog digital conversion circuit 7 to generate captured image data in accordance with various formats such as a joint photographic experts group (JPEG) format; an external memory controller 20 that performs control for storing data in the storage medium 21 and reading the data from the storage medium 21; a display section 23 that is composed of an organic electroluminescence (EL) display or a liquid crystal display; and a display controller 22 that controls display of the display section 23.

The storage medium 21 is a semiconductor memory such as a flash memory incorporated in the digital camera 100 or a portable semiconductor memory attachable to and detachable from the digital camera 100.

The memory controller 15, the digital signal processing section 17, the external memory controller 20, and the display controller 22 are connected to one another through the control bus 24 and the data bus 25, and are controlled through a command from the system controller 11.

Various hardware structures of the digital signal processing section 17 are various processors exemplified above that execute programs to perform processing.

Figure 2:
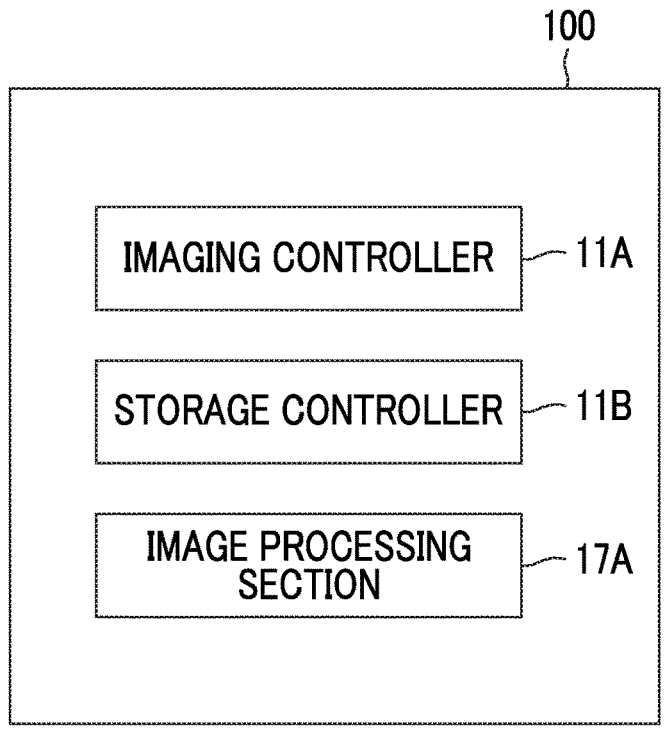
FIG. 2 is a functional block diagram of the digital camera 100 illustrated in FIG. 1.

FIG. 2 is a functional block diagram of the digital camera 100 illustrated in FIG. 1.

The digital camera 100 comprises an imaging controller 11A, a storage controller 11B, and an image processing section 17A as functional blocks.

The system controller 11 functions as the imaging controller 11A and the storage controller 11B by executing programs including an imaging program.

The digital signal processing section 17 functions as the image processing section 17A by executing programs including the imaging program.

In the focus bracketing mode, the imaging controller 11A continuously performs a plurality of imaging control operations (hereinafter, referred to as bracket imaging control operations) for causing the imager 5 to perform imaging of the subject through the imaging optical system in a state where the principal point of the focus lens is set at each of the plurality of imaging positions which are set in the movement range as at least a partial range of the movable range of the focus lens.

The image processing section 17A generates captured image data by processing captured image signals sequentially output from the imager 5 while performing the bracket imaging control, and temporarily stores the generated captured image data in the main memory 16.

The storage controller 11B stores a part or all of the captured image data, which is temporarily stored in the main memory 16 through the bracket imaging control, in the storage medium 21 through the external memory controller 20.

The image processing section 17A generates composite image data subjected to depth composition by combining the captured image data stored in the storage medium 21 under the control of the storage controller 11B, and stores this composite image data in the storage medium 21 through the external memory controller 20.

Figure 3:
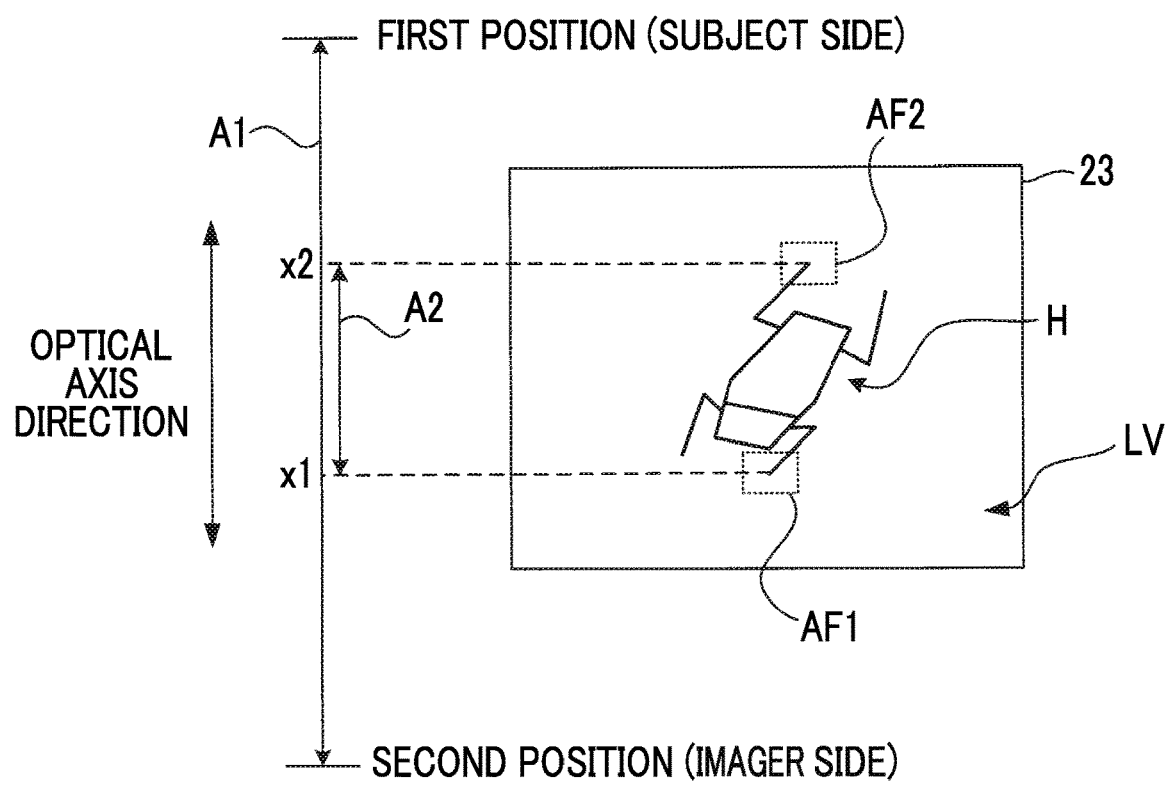
FIG. 3 is a schematic view illustrating a relationship between a movable range of a focus lens and a movement range determined in bracket imaging control.

FIG. 3 is a schematic view illustrating a relationship between the movable range of the focus lens and the movement range determined in the bracket imaging control.

As described above, a movable range A1 of the focus lens is a range between the first position closer to the subject and the second position closer to the imager 5. FIG. 3 exemplifies a movement range A2 which is a partial range of the movable range A1.

The movement range A2 is a range which is designated in advance by a user in a case of performing imaging in the focus bracketing mode. For example, the system controller 11 sets the movement range A2 as follows.

In a case of setting the focus bracketing mode, the system controller 11 causes the display section 23 to display a live view image of a subject image captured by the imager 5.

FIG. 3 illustrates an example in which a live view image LV including an insect H as a subject is displayed on the display section 23.

A user designates a range in which the user wants to bring the insect H into focus while viewing the display section 23. For example, in a case where the display section 23 is a touch panel type, the area AF1 and the area AF2 illustrated in FIG. 3 each are touched with a finger.

In a case where the area AF1 and the area AF2 are touched, the system controller 11 calculates a principal point position x1 of the focus lens in a case of bringing the subject within the area AF1 into focus and a principal point position x2 of the focus lens in a case of bringing the subject within the area AF2 into focus, and sets a range between the principal point position x1 and the principal point position x2 as the movement range A2.

The principal point position x1 and the principal point position x2 can be obtained by a contrast AF method or a phase difference AF method.

Here, although the example in which the movement range A2 is set as a range narrower than the movable range A1 is illustrated, the entire movable range A1 may be set as the movement range A2.

The imaging controller 11A continuously performs the bracket imaging control K times in a case of receiving an instruction to start imaging in a state where the movement range A2 is set. K is an integer of 2 or more.

Information on the number of imaging operations performed by the imager 5 (the number of imaging operations) is associated with the order of execution of each of K bracket imaging control operations.

Specifically, as the order of the bracket imaging control to be executed is later, a larger value of the number of imaging operations is associated with the order.

For example, information about the number of imaging operations=3 is associated with the bracket imaging control to be executed for the first time, information about the number of imaging operations=8 is associated to the bracket imaging control to be executed for the second time, information about the number of imaging operations=15 is associated with the bracket imaging control to be executed for the third time, . . . and so on.

The imaging controller 11A sets the imaging position of the focus lens in the movement range A2 in a case of performing each bracket imaging control on the basis of the movement range A2 designated by a user and the number of imaging operations corresponding to the order of execution of each bracket imaging control, and stores the setting information in the main memory 16 in association with the order of the bracket imaging control.

A method of setting the imaging position of the focus lens at the time of each bracket imaging control performed by the imaging controller 11A will be described by using the following assumption in examples.

(Assumption)
Movement range A2=40 pulses in a case where the movement range is converted into the number of driving pulses of the motor that drives the focus lens
Number of bracket imaging control operations performed in response to the instruction to start imaging K=3
Number of imaging operations corresponding to the first bracket imaging control=5
Number of imaging operations corresponding to the second bracket imaging control=8
Number of imaging times corresponding to the third bracket imaging control=14

Figure 4:
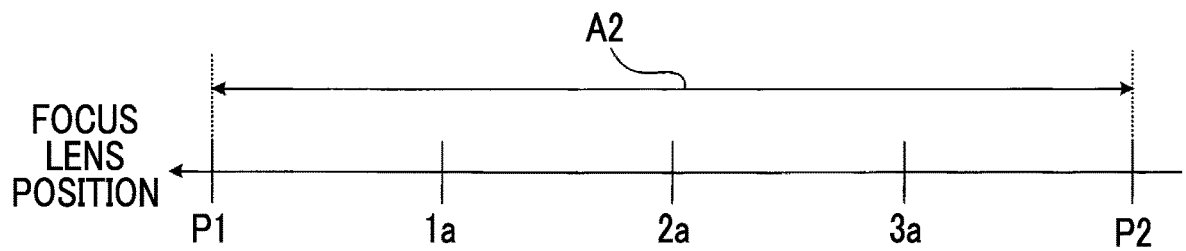
FIG. 4 is a diagram illustrating an example of a setting pattern of imaging positions in the movement range.

The imaging controller 11A sets five imaging positions, which are for equally dividing the movement range A2 into four parts, in the movement range A2, as illustrated in FIG. 4, for the bracket imaging control to be executed for the first time.

FIG. 4 illustrates a setting pattern in which five imaging positions (P1, P2, 1a, 2a, and 3a) are set in the movement range A2. Each distance between each of the five imaging positions and the imaging position adjacent thereto is equivalent to 10 pulses.

The imaging position P1 is an imaging position set to be closest to the subject side (the first position side illustrated in FIG. 3) of the movement range A2, and composes a first imaging position.

The imaging position P2 is an imaging position set to be closest to the imager 5 (the second position side illustrated in FIG. 3) of the movement range A2, and composes a second imaging position.

The imaging positions 1a to 3a are positions between the imaging position P1 and the imaging position P2, and respectively compose third imaging positions.

The imaging controller 11A determines a movement distance (5 pulses in this example) of the focus lens such that imaging can be performed eight times in the movement range A2 for the bracket imaging control to be executed for the second time.

Figure 5:
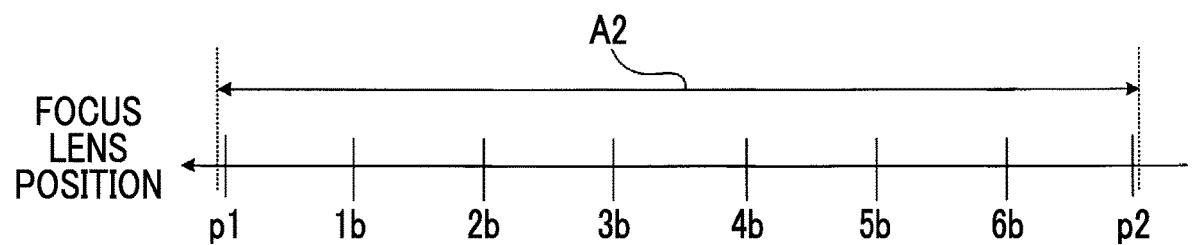
FIG. 5 is a diagram illustrating an example of a setting pattern of imaging positions in the movement range.

Then, as illustrated in FIG. 5, the imaging controller 11A sets eight positions as imaging positions such that which the distances between adjacent imaging positions are equal to this movement distance.

FIG. 5 illustrates a setting pattern in which eight imaging positions (p1, p2, 1b, 2b, 3b, 4b, 5b, and 6b) are set in the movement range A2. Each distance between each of the eight imaging positions and the imaging position adjacent thereto is equivalent to 5 pulses.

The imaging position p1 illustrated in FIG. 5 is an imaging position closest to the first position, similarly to the imaging position P1 illustrated in FIG. 4.

The imaging position p2 illustrated in FIG. 5 is an imaging position closest to the second position, similarly to the imaging position P2 illustrated in FIG. 4.

The imaging positions 1b to 6b are positions between the imaging position p1 and the imaging position p2, and respectively compose the third imaging positions.

The imaging controller 11A determines a movement distance (3 pulses in this example) of the focus lens such that imaging can be performed fourteen times in the movement range A2 for the bracket imaging control to be executed for the third time.

Figure 6:
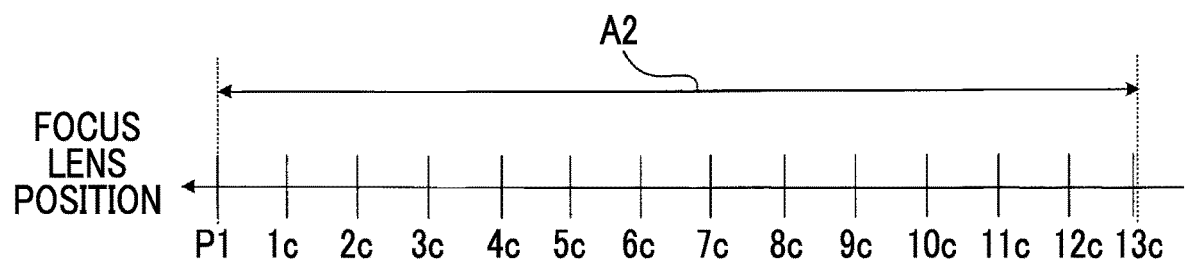
FIG. 6 is a diagram illustrating an example of a setting pattern of imaging positions in the movement range.

Then, as illustrated in FIG. 6, the imaging controller 11A sets fourteen positions as imaging positions such that which the distances between adjacent imaging positions are equal to this movement distance.

FIG. 6 illustrates a setting pattern in which fourteen imaging positions (P1, 1c, 2c, 3c, 4c, 5c, 6c, 7c, 9c, 10c, 11c, 12c, and 13c) are set in the movement range A2. Each distance between each of the fourteen imaging positions and the imaging position adjacent thereto is equivalent to 3apulses.

The imaging position P1 illustrated in FIG. 6 is an imaging position closest to the first position, similarly to the imaging position P1 illustrated in FIG. 4.

The imaging position 13c illustrated in FIG. 6 is an imaging position closest to the second position, similarly to the imaging position P2 illustrated in FIG. 4.

The imaging positions 1c to 12c are positions between the imaging position P1 and the imaging position 13c, and respectively compose the third imaging positions.

In a case of performing the first bracket imaging control, the imaging controller 11A performs imaging five times while sequentially setting the principal points of the focus lens at the five imaging positions illustrated in FIG. 4.

In a case of performing the second bracket imaging control, the imaging controller 11A performs imaging eight times while sequentially setting the principal points of the focus lens at the eight imaging positions illustrated in FIG. 5.

In a case of performing the third bracket imaging control, the imaging controller 11A performs imaging fourteen times while sequentially setting the principal points of the focus lens at the fourteen imaging positions illustrated in FIG. 6.

In addition, the information about the number of imaging operations, which correspond to the bracket imaging control to be executed at the end among K bracket imaging control operations, is not a value which is stored in advance, and may be used in a configuration using a value such as the number of pulses indicating the movement range A2.

In other words, in a case where the movement range A2 is equivalent to 40 pulses, for the bracket imaging control to be performed at the end among the K bracket imaging control operations, positions for equally dividing the movement range A2 into 39 parts may be set as imaging positions.

As described above, the imaging controller 11A performs continuous imaging by setting narrower distances between the imaging positions in the movement range A2 and setting a larger number of imaging positions in the movement range A2 in the bracket imaging control performed later in time series among the K bracket imaging control operations after the instruction to start imaging is received.

Figure 7:
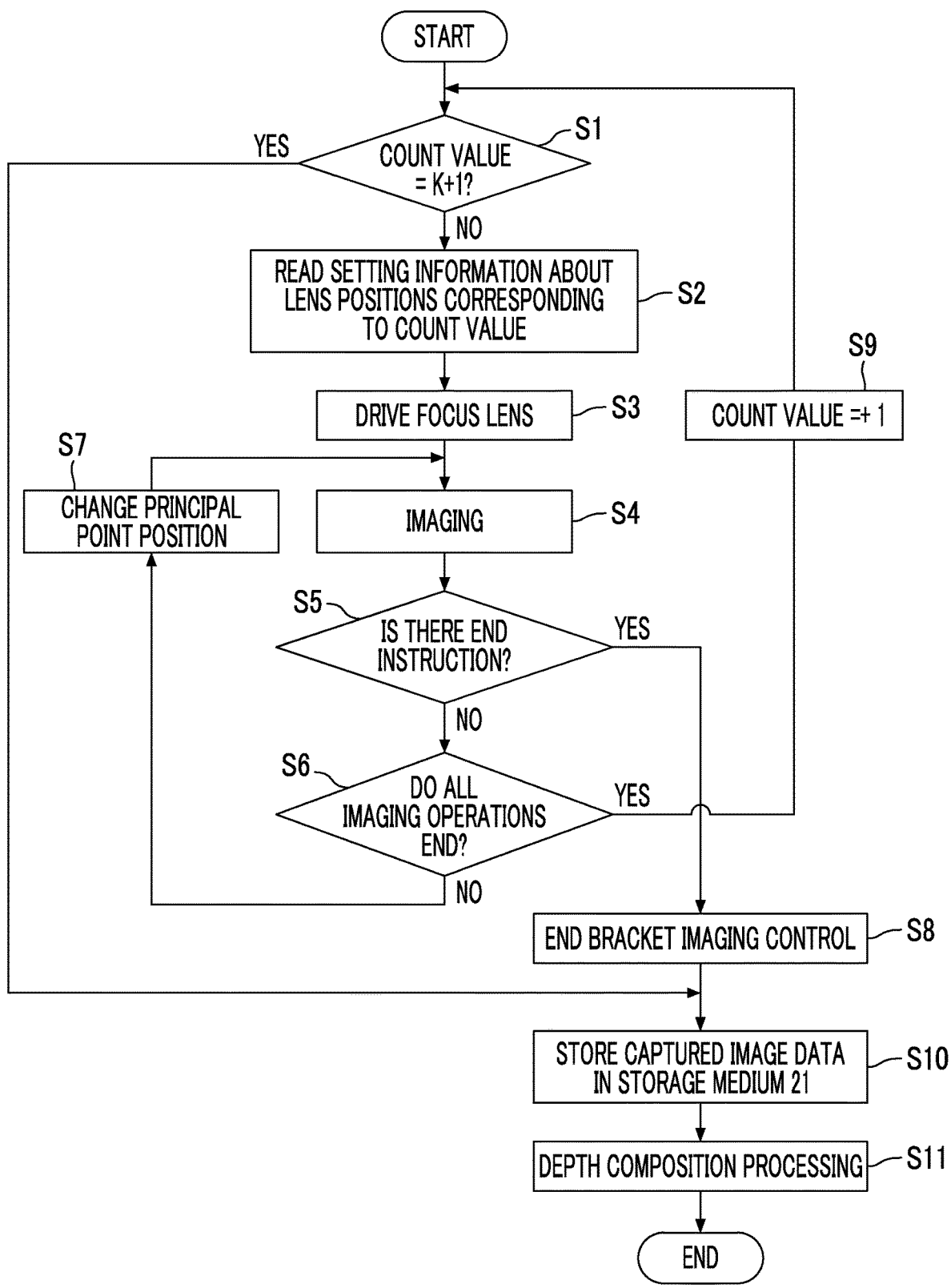
FIG. 7 is a flowchart for explaining an imaging operation in a focus bracketing mode of the digital camera 100 illustrated in FIG. 1.

FIG. 7 is a flowchart for explaining an imaging operation in the focus bracket mode of the digital camera 100 illustrated in FIG. 1.

In a case where the focus bracketing mode is set and the movement range A2 is designated by a user, the imaging controller 11A generates setting information about setting of the imaging positions in each bracket imaging control on the basis of the movement range A2 and the number of imaging operations corresponding to the order of each of the K bracket imaging control operations, and stores the generated setting information in the main memory 16 in association with the order of each bracket imaging control.

Then, the imaging controller 11A checks a count value of a counter incorporated in the system controller 11, and determines whether or not the count value is "K+1" (step S1).

The count value of the counter is set as an initial value "1" at the time of issuing the instruction to start imaging. The count value indicates the order of the bracket imaging control to be performed from now on.

Here, immediately after the instruction to start imaging is issued, the determination in step S1 is NO, and the processing in step S2 is performed.

In step S2, the imaging controller 11A reads setting information about setting of the imaging positions corresponding to count value=1 (first bracket imaging control), from the main memory 16.

Then, the imaging controller 11A sets the principal point of the focus lens at any of a plurality of imaging positions (here, the imaging position closest to the second position among the plurality of imaging positions) based on the setting information which is read in step S2 (step S3).

In a case where the principal point of the focus lens reaches the imaging position in the processing in step S3, the imaging controller 11A performs imaging through the imager 5 (step S4).

The image processing section 17A generates captured image data by processing the captured image signal which is output from the imager 5 through the imaging, and temporarily stores the generated captured image data in the main memory 16 in association with the current count value.

After step S4, the imaging controller 11A determines whether or not an instruction to end imaging is input from the operation section 14 (step S5).

In a case where the instruction to end imaging is issued (step S5: YES), the imaging controller 11A ends the bracket imaging control in progress (step S8).

After step S8, the processing in step S10 is performed. A user gives the instruction to end the imaging, for example, in a case where the subject to be brought into focus starts moving during imaging.

In a case where there is no instruction to end imaging (step S5: NO), the imaging controller 11A determines whether or not imaging is performed in a state where the principal point of the focus lens is at all of the plurality of imaging positions based on the setting information which is read in step S2 (step S6).

In a case where the determination in step S6 is NO, the imaging controller 11A moves the principal point of the focus lens from the current imaging position to the next imaging position on the basis of the setting information which is read in step S2 (step S7). After step S7, the processing in and after step S4 is performed. Steps S2, S3, S4, and S7 compose an imaging control step.

As a result of repeating the processing in step S4 and step S7, in a case where the determination of step S6 is YES, the imaging controller 11A increments the count value of the counter by one (step S9), and returns the processing to step S1.

In a case where the count value is equal to K+1 in step S1 (step S1: YES), that is, in a case where all K bracket imaging control operations are completed, the processing in step S10 is performed.

In step S10, the storage controller 11B reads a part of the captured image data temporarily stored in the main memory 16 through the processing in step S4, and stores the read captured image data in the storage medium 21 through the external memory controller 20. Step S10 composes a storage control step.

Specifically, the storage controller 11B reads the captured image data, which is obtained through the bracket imaging control in which the distances between the imaging positions are the narrowest (in other words, the number of set imaging positions is the largest), among the pieces of the captured image data stored in the main memory 16 through the completed bracket imaging control, and stores the captured image data in the storage medium 21.

The state in which the bracket imaging control is completed means a state in which imaging is performed in a state in which the principal point of the focus lens is moved to all the imaging positions based on the setting information corresponding to the bracket imaging control.

For example, the following case is assumed. After the instruction to start imaging is issued, the first bracket imaging control (five imaging operations) based on the setting information illustrated in FIG. 4 is completed, and five pieces of the captured image data are stored in the main memory 16. Thereafter, the second bracket imaging control (eight imaging operations) based on the setting information illustrated in FIG. 5 is completed, and eight pieces of the captured image data are stored in the main memory 16. Then, the instruction to end imaging is issued while the third bracket imaging control based on the setting information illustrated in FIG. 6 is being performed.

In such a case, five pieces of the captured image data obtained through the first bracket imaging control and eight pieces of the captured image data obtained by the second bracket imaging control are captured image data obtained through the completed bracket imaging control.

The storage controller 11B selects a captured image data group obtained by performing more imaging among the captured image data group consisting of the five pieces of the captured image data and the captured image data group consisting of the eight pieces of the captured image data. Then, the storage controller 11B stores the selected captured image data group in the storage medium 21.

After step S10, the image processing section 17A generates composite image data subjected to depth composition by combining the captured image data group stored in the storage medium 21 in the processing in step S10, and stores the generated composite image data in the storage medium 21 (step S11). Step S11 composes an image processing step.

In a case where the composite image data is stored in the storage medium 21, the storage controller 11B may delete, from the storage medium 21, the captured image data (the captured image data group stored in step S10) used to generate the composite image data.

As described above, according to the digital camera 100, in the focus bracketing mode, the bracket imaging control is continuously performed K times after the instruction to start imaging is issued, and the distances between the imaging positions are made to be narrower in the bracket imaging control performed later among the K bracket imaging control operations.

For this reason, in the initial stage where the instruction to start imaging is issued, the bracket imaging control can be completed in a short time by a small number of imaging operations. Therefore, it is possible to increase the probability that at least one bracket imaging control necessary for depth composition can be completed before the subject to be brought into focus moves, and it is possible to avoid imaging failure.

In addition, as the number of executed operations of the bracket imaging control increases, continuous imaging is performed at finer movement distances of the focus lens. Thus, in a case where the subject does not move, it is possible to perform depth composition using a large amount of captured image data, and it is possible to improve the sense of resolution of composite image data.

It should be noted that the storage controller 11B may read all pieces of the captured image data temporarily stored in the main memory 16 and store the captured image data in the storage medium 21 in step S10 of FIG. 7.

In such a case, since it is possible to perform depth composition using all pieces of the captured image data obtained after the instruction to start imaging is issued, it is possible to increase the number of pieces of the captured image data to be combined. As a result, the sense of resolution of the image can be further improved.

Further, in such a case, it is preferable that the imaging controller 11A generates setting information corresponding to each bracket imaging control such that all the imaging positions of the focus lens which is set in each of the K bracket imaging control operations are different.

According to this configuration, all pieces of the captured image data stored in the main memory 16 are obtained through imaging at principal point positions of the focus lens which are all different. Thus, in a case where all pieces of the captured image data stored in the main memory 16 are combined, it is possible to obtain composite image data with a high sense of resolution.

Further, in such a case, in a state where a plurality of captured image data groups are stored in the storage medium 21, the image processing section 17A may generate a plurality of composite image data pieces by performing composition processing individually on each of the plurality of captured image data groups, and may store the plurality of composite image data in the storage medium 21.

According to this configuration, it is possible to store a plurality of composite image data having different sense of resolution in response to one instruction. Therefore, it is possible to increase the possibility of providing composite image data with a sense of resolution suitable for the user's preference.

Figure 8:
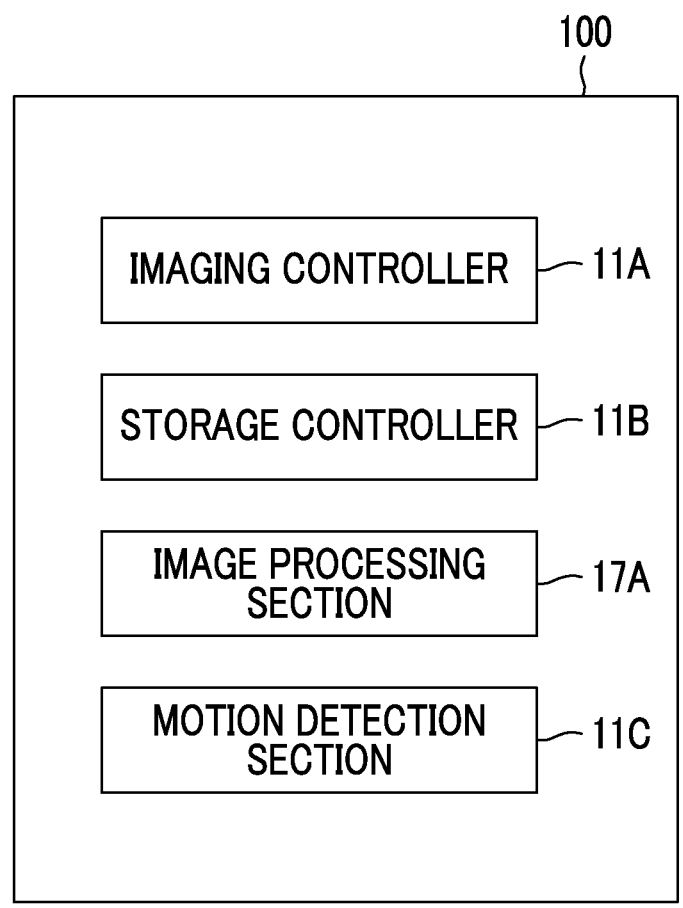
FIG. 8 is a diagram illustrating a modification example of functional blocks of the digital camera 100 illustrated in FIG. 1.

FIG. 8 is a diagram illustrating a modification example of the functional block of the digital camera 100 shown in FIG. 1. In FIG. 8, each configuration, which is the same as that in FIG. 2, is represented by each same reference numeral and sign, and description thereof will be omitted. The hardware configuration of the digital camera 100 illustrated in FIG. 8 is the same as that of FIG. 1, and thus description thereof will be omitted.

The digital camera 100 illustrated in FIG. 8 comprises, as functional blocks, the imaging controller 11A, the storage controller 11B, the image processing section 17A, and a motion detection section 11C.

The system controller 11 functions as the imaging controller 11A, the storage controller 11B, and the motion detection section 11C by executing programs including an imaging program.

The motion detection section 11C detects the motion of the subject during imaging by the imager 5 on the basis of the captured image data temporarily stored in the main memory 16 through the bracket imaging control performed by the imaging controller 11A.

The motion detection section 11C detects whether or not the subject during imaging has a motion by comparing the latest captured image data stored in the main memory 16 through the bracket imaging control performed by the imaging controller 11A with the captured image data stored immediately before the latest captured image data.

Figure 9:
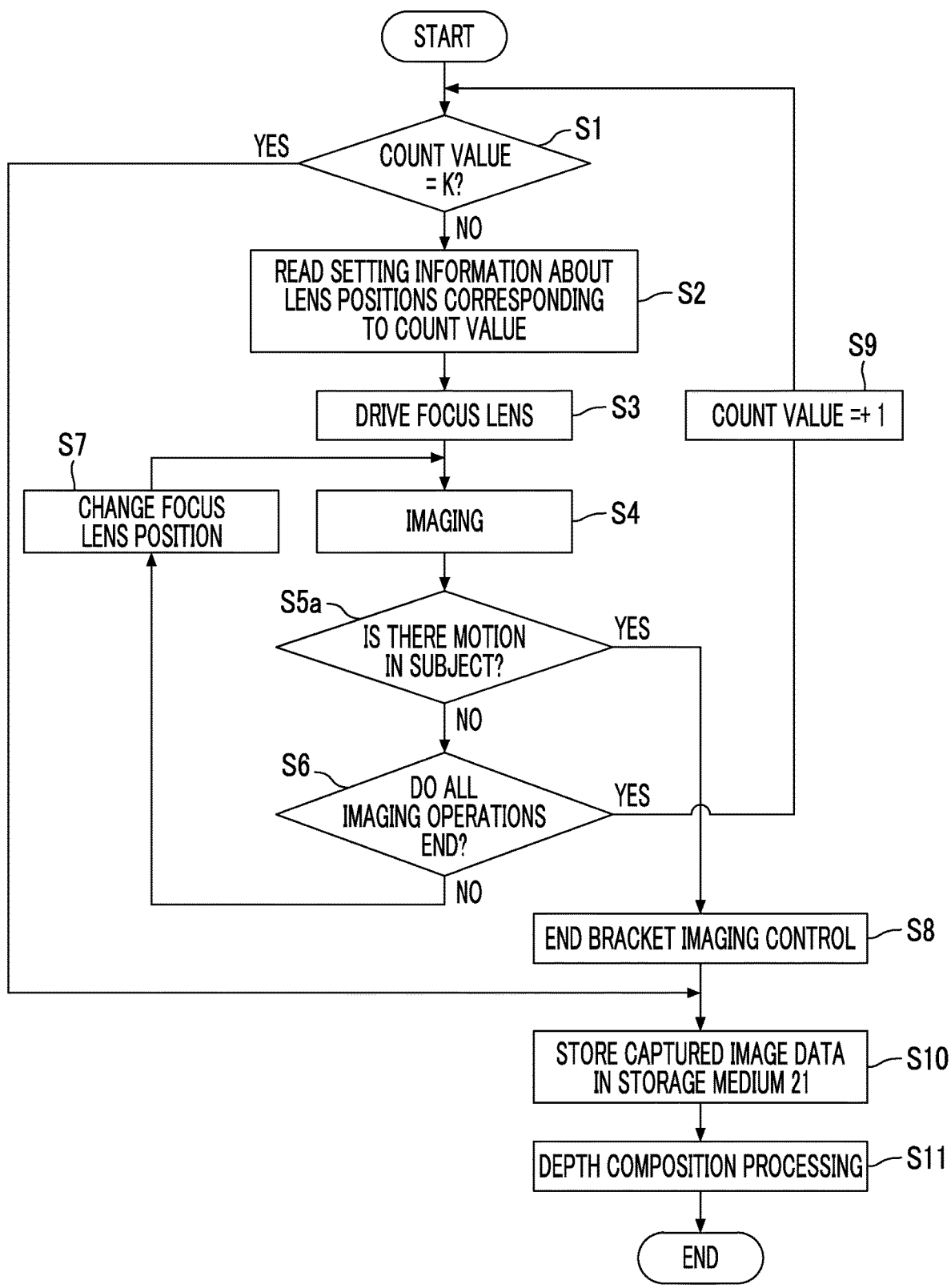
FIG. 9 is a flowchart for explaining an imaging operation in the focus bracketing mode of the digital camera 100 illustrated in FIG. 8.

FIG. 9 is a flowchart for explaining an imaging operation of the digital camera 100 illustrated in FIG. 8 in the focus bracketing mode. In FIG. 9, each processing, which is the same as that in FIG. 7, is represented by each same reference numeral and sign, and description thereof will be omitted.

After step S4, the motion detection section 11C detects the motion of the subject during imaging by comparing the captured image data stored in the main memory 16 through the imaging of immediately previous step S4 with the captured image data stored in the main memory 16 through the imaging of second step S4 (step S5a).

Then, in a case where the motion is detected (step S5a: YES), the processing after step S8 is performed and in a case where the motion is not detected (step S5a: NO), the processing in and after step S6 is performed.

As described above, according to the digital camera 100 illustrated in FIG. 8, the bracket imaging control automatically ends at the time at which the subject during imaging moves. Therefore, unnecessary imaging can be prevented from being performed.

In addition, even in a case where the subject has a motion, it is possible to generate the composite image data on the basis of the captured image data stored in the main memory 16 until the motion is detected. Thus, the possibility of imaging failure can be reduced.

It is preferable that the imaging controller 11A illustrated in FIGS. 1 and 8 does not move the principal point position of the focus lens in one direction in the movement range A2 while performing bracket imaging control but sets a certain imaging position in the movement range A2 as a starting point and moves the principal point position of the focus lens alternately in front of and behind the imaging position.

Figure 10:
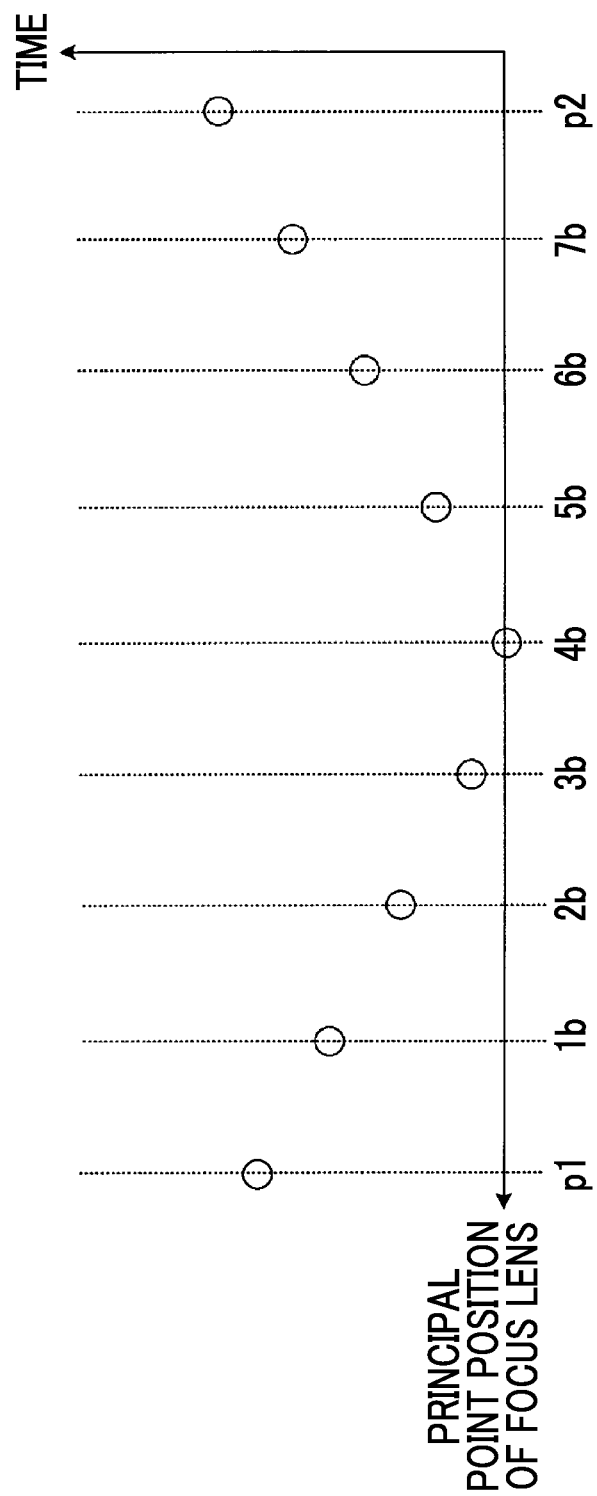
FIG. 10 is a diagram illustrating an example of a method of moving the focus lens while performing the bracket imaging control.

FIG. 10 is a diagram illustrating an example of a method of moving the principal point position of the focus lens while performing the bracket imaging control.

FIG. 10 illustrates an example of movement of the focus lens in a case where eight imaging positions illustrated in FIG. 5 are set as imaging positions at which imaging is performed under the bracket imaging control.

In a case where the bracket imaging control is started, the imaging controller 11A moves the principal point of the focus lens to the imaging position 4b between the imaging position p1 and the imaging position p2 (in the example of FIG. 10, in the middle between the imaging position p1 and the imaging position p2), and performs imaging.

Next, the imaging controller 11A moves the principal point of the focus lens to the next imaging position 3b on the first position side of the imaging position 4b from the state where the principal point of the focus lens is at the imaging position 4b, and performs imaging.

Then, the imaging controller 11A moves the principal point of the focus lens to the next imaging position 5b on the second position side of the imaging position 4b from the state where the principal point of the focus lens is at the imaging position 3b, and performs imaging.

Thereafter, the imaging controller 11A moves the principal point of the focus lens to the next two imaging positions 2b on the first position side of the imaging position 4b from the state where the principal point of the focus lens is at the imaging position 5b, and performs imaging.

Next, the imaging controller 11A moves the principal point of the focus lens to the next two imaging positions 6b on the second position side of the imaging position 4b from the state where the principal point of the focus lens is at the imaging position 2b, and performs imaging.

Then, the imaging controller 11A moves the principal point of the focus lens to the next three imaging positions 1b on the first position side of the imaging position 4b from the state where the principal point of the focus lens is at the imaging position 6b, and performs imaging.

Thereafter, the imaging controller 11A moves the principal point of the focus lens to the next three imaging positions 7b on the second position side of the imaging position 4b from the state where the principal point of the focus lens is at the imaging position 1b, and performs imaging.

Next, the imaging controller 11A moves the principal point of the focus lens to the next four imaging positions p1 on the first position side of the imaging position 4b from the state where the principal point of the focus lens is at the imaging position 7b, and performs imaging.

Finally, the imaging controller 11A moves the principal point of the focus lens to the next four imaging positions p2 on the second position side of the imaging position 4b from the state where the principal point of the focus lens is at the imaging position p1, and performs imaging, thereby completing the bracket imaging control.

As described above, according to the method of moving the focus lens illustrated in FIG. 10, imaging is performed sequentially from the vicinity of the center of the movement range A2.

Therefore, even in a case where the instruction to end imaging is issued during the bracket imaging control or the subject moves and the bracket imaging control ends halfway, by combining the captured image data pieces obtained until the bracket imaging control ends, it is possible to obtain composite image data which is obtained in a case where the entire subject is roughly in focus.

For example, even in a case where the subject moves during execution of the first bracket imaging control, it is possible to obtain composite image data in which the subject is roughly in focus. In such a case, the quality of the synthetic image data is not satisfactory.

However, in a case of imaging an insect or the like which can be imaged rarely, a picture of the insect can be taken with a certain quality, and the user's satisfaction can be enhanced.

Figure 11:
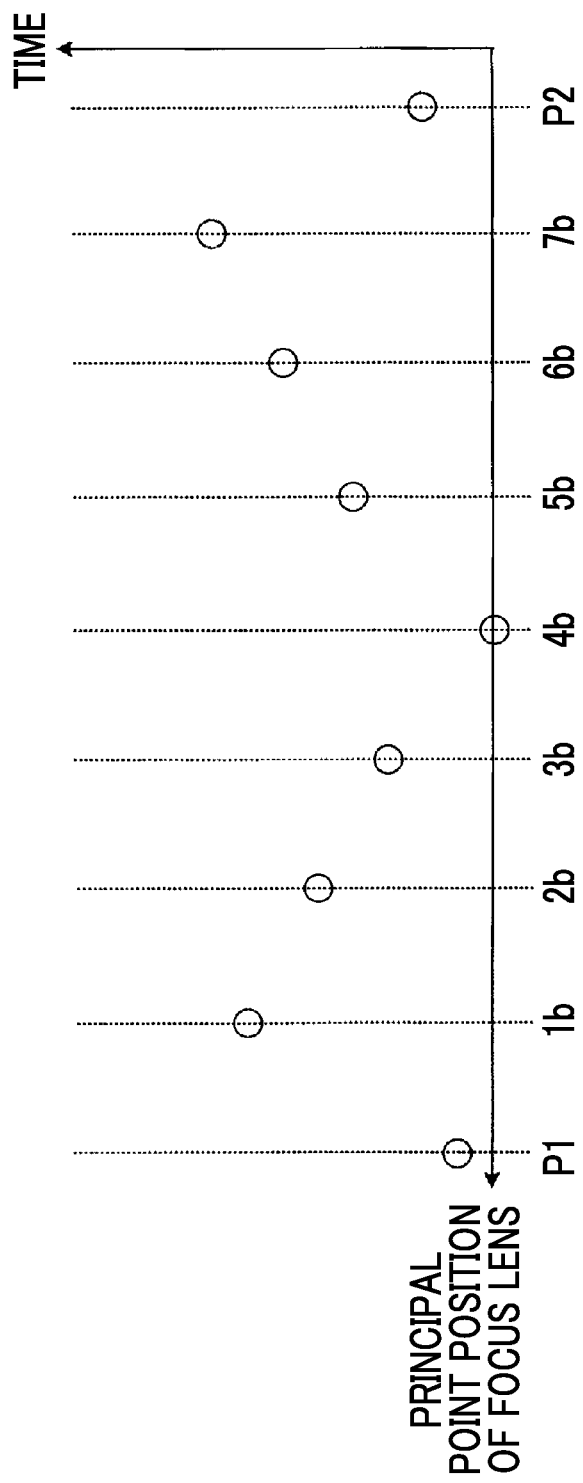
FIG. 11 is a diagram illustrating another example of the moving method of the focus lens while performing the bracket imaging control.

FIG. 11 is a diagram illustrating another example of the method of moving the principal point position of the focus lens while performing the bracket imaging control.

FIG. 11 illustrates an example of movement of the focus lens in a case where eight imaging positions illustrated in FIG. 5 are set as imaging positions at which imaging is performed under the bracket imaging control.

In a case where the bracket imaging control is started, the imaging controller 11A moves the principal point of the focus lens to the imaging position 4b between the imaging position p1 and the imaging position p2 (in the example of FIG. 11, in the middle between the imaging position p1 and the imaging position p2), and performs imaging.

Next, the imaging controller 11A performs imaging by moving the principal point of the focus lens to the imaging position p1 from a state in which the principal point of the focus lens is at the imaging position 4b.

Then, the imaging controller 11A performs imaging by moving the principal point of the focus lens to the imaging position p2 from the state where the principal point of the focus lens is at the imaging position p1.

Next, the imaging controller 11A moves the principal point of the focus lens to the next imaging position 3b on the first position side of the imaging position 4b from the state where the principal point of the focus lens is at the imaging position p2, and performs imaging.

Then, the imaging controller 11A moves the principal point of the focus lens to the next imaging position 5b on the second position side of the imaging position 4b from the state where the principal point of the focus lens is at the imaging position 3b, and performs imaging.

Thereafter, the imaging controller 11A moves the principal point of the focus lens to the next two imaging positions 2b on the first position side of the imaging position 4b from the state where the principal point of the focus lens is at the imaging position 5b, and performs imaging.

Next, the imaging controller 11A moves the principal point of the focus lens to the next two imaging positions 6b on the second position side of the imaging position 4b from the state where the principal point of the focus lens is at the imaging position 2b, and performs imaging.

Then, the imaging controller 11A moves the principal point of the focus lens to the next three imaging positions 1b on the first position side of the imaging position 4b from the state where the principal point of the focus lens is at the imaging position 6b, and performs imaging.

Finally, the imaging controller 11A moves the principal point of the focus lens to the next three imaging positions 7b on the second position of the imaging position 4b from the state where the principal point of the focus lens is at the imaging position 1b, and performs imaging, thereby completing the bracket imaging control.

As described above, according to the method of moving the focus lens illustrated in FIG. 11, imaging is preferentially performed in the vicinities of both ends and in the vicinity of the center of the movement range A2.

Therefore, even in a case where the instruction to end imaging is issued during the bracket imaging control or the subject moves and the bracket imaging control ends halfway, by combining the captured image data pieces obtained until the bracket imaging control ends, it is possible to obtain composite image data which is obtained in a case where the front, rear, and center of the subject are in focus.

According to this method, the possibility of obtaining composite image data in which the entire subject is in focus becomes higher than that in the method illustrated in FIG. 10. Therefore, in a case where the bracket imaging control ends halfway, it is possible to obtain higher quality composite image data.

Figure 12:
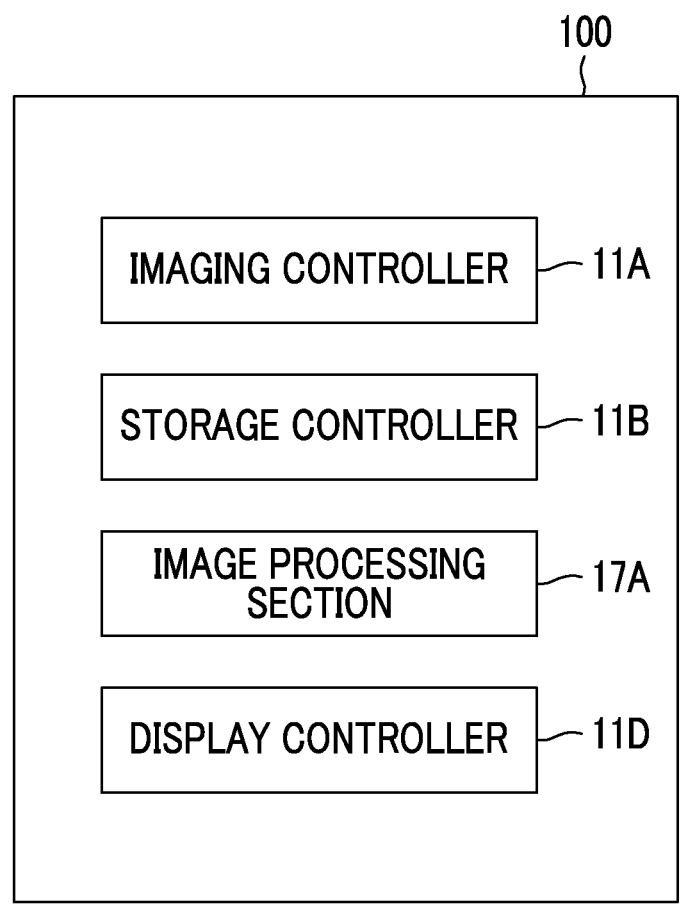
FIG. 12 is a diagram illustrating a modification example of functional blocks of the digital camera 100 illustrated in FIG. 1.

FIG. 12 is a diagram illustrating a modification example of the functional block of the digital camera 100 shown in FIG. 1. In FIG. 10, each configuration, which is the same as that in FIG. 2, is represented by each same reference numeral and sign, and description thereof will be omitted. The hardware configuration of the digital camera 100 illustrated in FIG. 12 is the same as that of FIG. 1, and thus description thereof will be omitted.

The digital camera 100 illustrated in FIG. 12 comprises, as functional blocks, the imaging controller 11A, the storage controller 11B, the image processing section 17A, and a display controller 11D.

The system controller 11 functions as the imaging controller 11A, the storage controller 11B, and the display controller 11D by executing programs including an imaging program.

In a case where the bracket imaging control is performed by the imaging controller 11A, the display controller 11D causes the display section 23 to display information based on the imaging position, which is set through the bracket imaging control, through the display controller 22.

The information based on the imaging position which is set in the bracket imaging control is a character indicating information, which indicates the number of imaging operations determined by the number of set imaging positions, or information or the like which indicates distances between the imaging positions.

Figure 13:
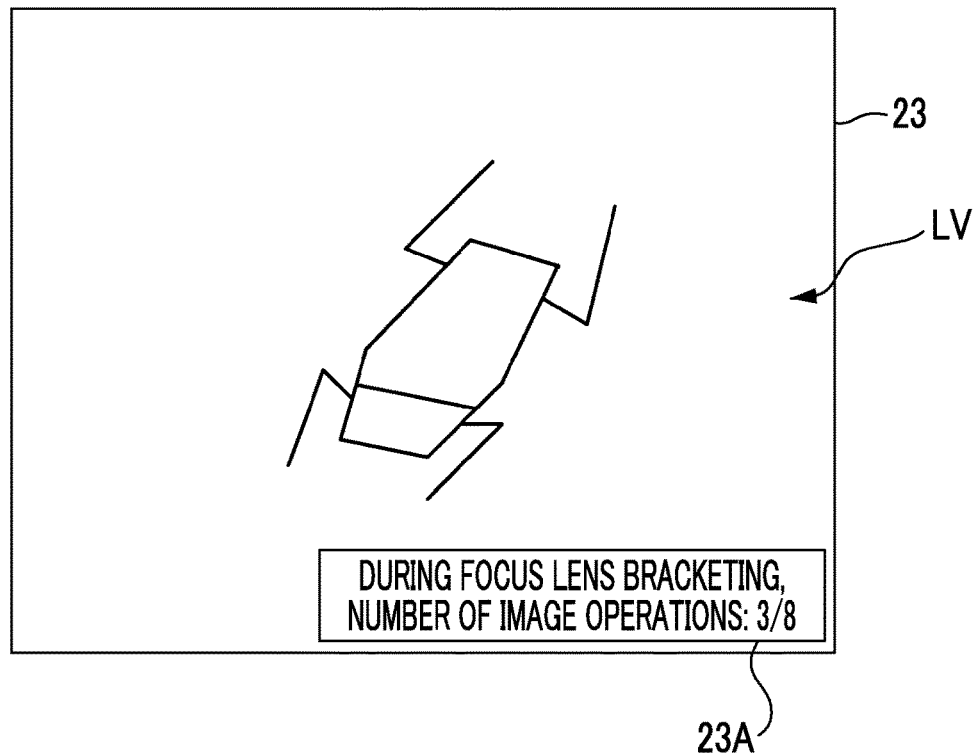
FIG. 13 is a diagram illustrating an example of information displayed on a display section 23 under control of a display controller 11D illustrated in FIG. 12.

FIG. 13 is a diagram illustrating an example of information displayed on a display section 23 under control of a display controller 11D illustrated in FIG. 12. FIG. 13 illustrates a display example in a case where the bracket imaging control is performed on the basis of the setting information for setting eight imaging positions illustrated in FIG. 5.

As illustrated in FIG. 13, during the bracket imaging control, the captured image data stored in the main memory 16 is displayed on the display section 23 as a live view image LV, and an image 23A is superimposed on the live view image LV.

The image 23A includes a character "8" indicating the number of imaging operations which are set in the bracket imaging control being executed, and a character "3" indicating the number of imaging operations which are already executed at the current time.

Figure 14:
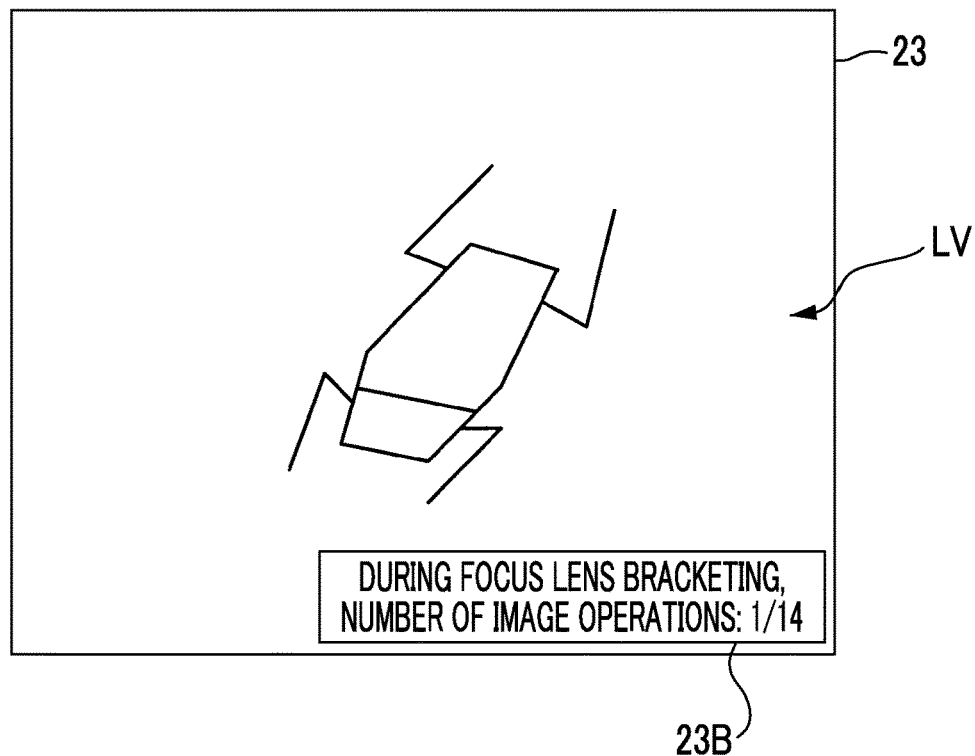
FIG. 14 is a diagram illustrating an example of information displayed on the display section 23 under control of the display controller 11D illustrated in FIG. 12.

FIG. 14 is a diagram illustrating an example of information displayed on a display section 23 under control of a display controller 11D illustrated in FIG. 12. FIG. 14 illustrates a display example in a case where the bracket imaging control is performed on the basis of the setting information for setting fourteen imaging positions illustrated in FIG. 6.

As illustrated in FIG. 14, during the bracket imaging control, the captured image data stored in the main memory 16 is displayed on the display section 23 as a live view image LV, and an image 23B is superimposed on the live view image LV.

The image 23B includes a character "14" indicating the number of imaging operations which are set in the bracket imaging control being executed, and a character "1" indicating the number of imaging operations which are already executed at the current time.

A user is able to grasp the progress of imaging by checking the images illustrated in FIGS. 13 and 14. For example, in a case where the user determines that imaging has been performed at sufficient distances, the user is able to issue the instruction to end imaging, thereby ending the bracket imaging control.

Thus, by displaying the images 23A and 23B, the user is able to end imaging at an appropriate timing. Therefore, unnecessary imaging for the user can be prevented from being performed, and power consumption can be reduced and the free space of the storage medium 21 can be increased.

The function of the display controller 11D illustrated in FIG. 12 can be added to the digital camera 100 illustrated in FIG. 8.

In the digital camera 100 illustrated in FIGS. 1, 8, and 12, it is preferable that the imaging controller 11A makes the F value of the stop, which is included in the imaging optical system, smaller as the bracket imaging control in which the distances between the imaging positions are narrower is performed.

According to this configuration, continuous imaging is performed with a shallow depth of field during the bracket imaging control using wide distances between imaging positions, and performed with a deep depth of field during the bracket imaging control using narrow distances between imaging positions.

Therefore, as compared with a case where the F value is constant in K bracket imaging control operations, it is possible to improve the sense of resolution of composite image data obtained by combining a plurality of pieces of captured image data obtained in one bracket imaging control operation. As a result, it is possible to improve the image quality of the composite image data.

In the digital camera 100 illustrated in FIGS. 1, 8 and 12, the image processing section 17A generates the composite image data.

However, in the processing of generating composite image data, an electronic device such as a tablet type terminal, a smart phone, or a personal computer capable of communicating with the digital camera 100 may acquire a plurality of captured image data pieces stored in the storage medium 21.

Further, the imaging controller 11A of the digital camera 100 illustrated in FIGS. 1, 8, and 12 makes the number of imaging operations, which are performed in each of the K bracket imaging control operations, the same, and may set narrower distances between the imaging positions, which are set in each bracket imaging control operation, in the bracket imaging control operation performed later.

For example, the imaging controller 11A performs imaging in a state where the principal point position of the focus lens is at imaging positions P1 and P2 illustrated in FIG. 4 in the first bracket imaging control, performs imaging in a state where the principal point position of the lens is at the imaging positions 1a and 3a illustrated in FIG. 4 in the second bracket imaging control, and performs imaging in a state where the principal point position of the focus lens is at the imaging positions 2b and 5b illustrated in FIG. 5 in the third bracket imaging control.

As described above, even in the case where bracket imaging control is performed while narrowing the distances of a plurality of imaging positions, it is possible to reduce the possibility of imaging fails by combining the captured image data obtained in all the imaging operations to generate composite image data.

Next, a configuration of a smartphone will be described as an embodiment of the imaging apparatus of the present invention.

Figure 15:
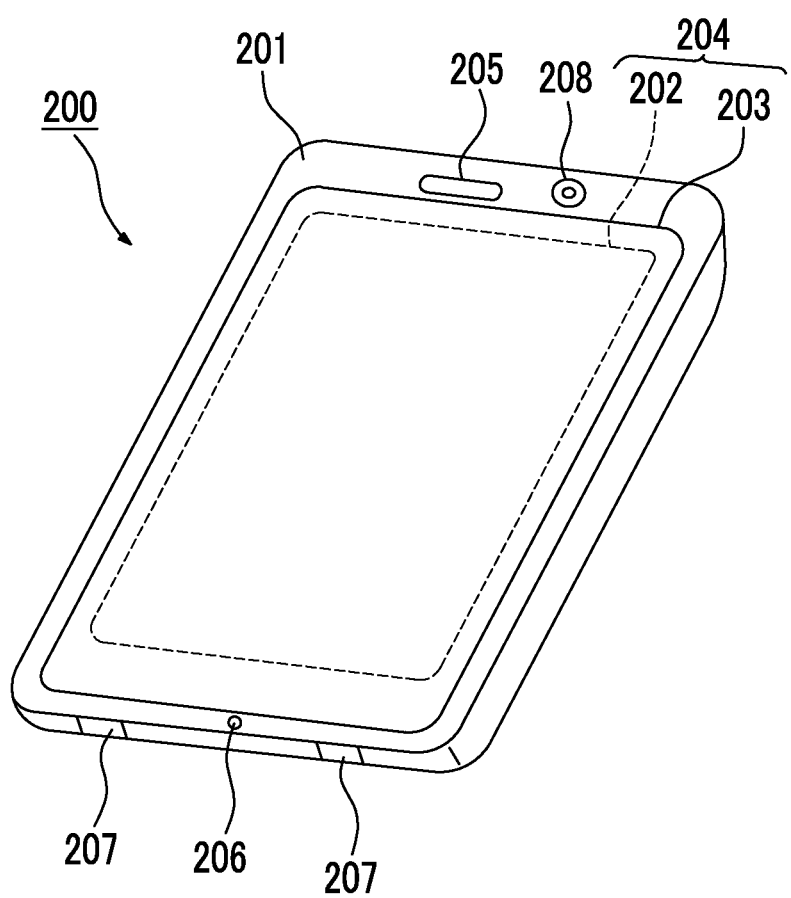
FIG. 15 is a diagram illustrating an appearance of a smartphone 200 which is an embodiment of an imaging apparatus according to an embodiment of the present invention.

FIG. 15 illustrates an appearance of a smartphone 200 as the imaging apparatus according to the above-mentioned embodiment of the present invention.

The smartphone 200 illustrated in FIG. 15 comprises: a housing 201 that has a flat plate shape; a display panel 202 as a display section on one side of the housing 201; and a display input section 204 into which an operation panel 203 as an input section is integrated.

Further, the housing 201 comprises a speaker 205, a microphone 206, operation sections 207, and a camera section 208. It should be noted that the configuration of the housing 201 is not limited to this. For example, it may be possible to adopt a configuration in which the input section and the display section are independent, or it may be possible to adopt a configuration having a slide mechanism or a folded structure.

Figure 16:
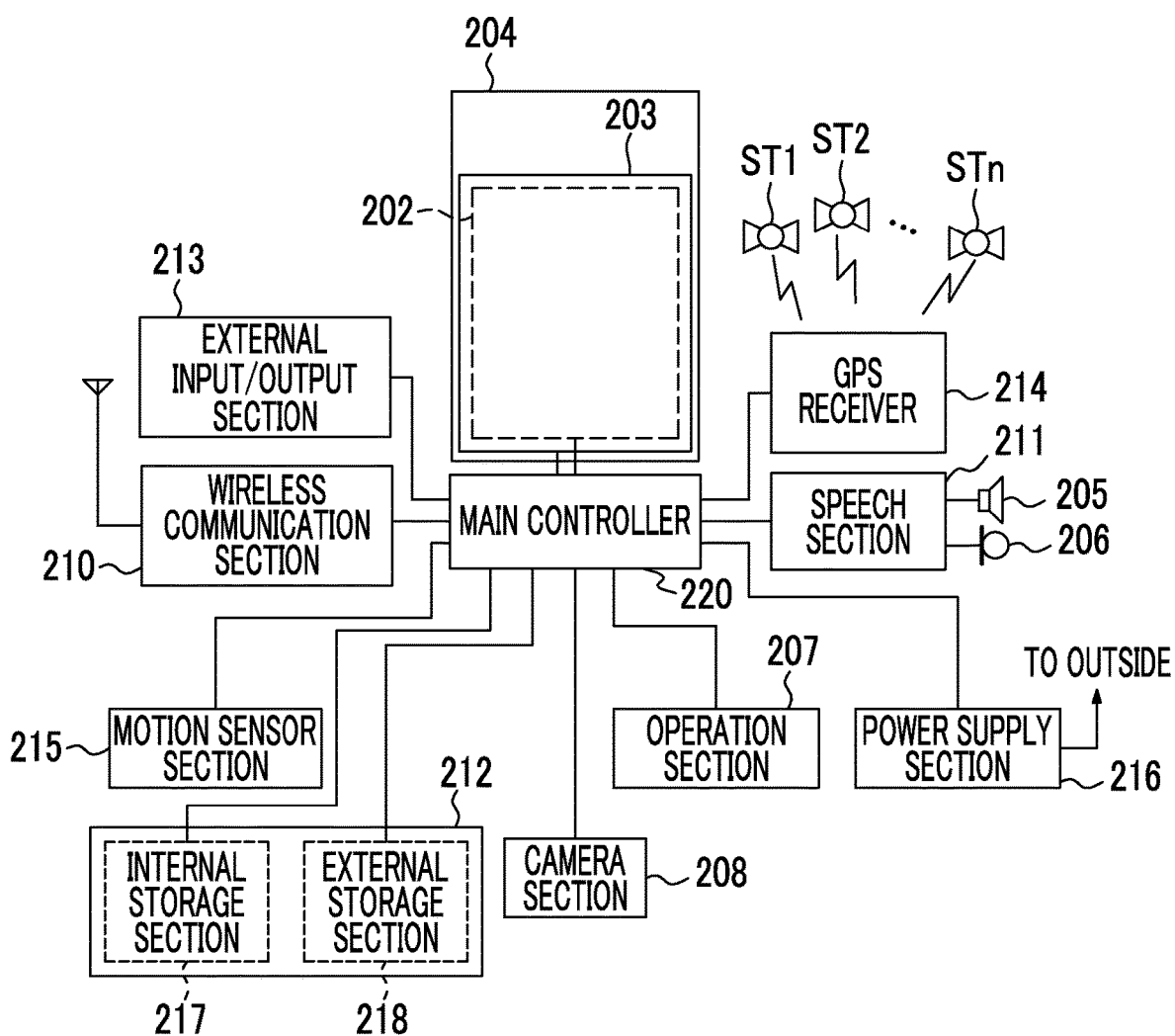
FIG. 16 is a block diagram illustrating a configuration of the smartphone 200 illustrated in FIG. 15.

FIG. 16 is a block diagram illustrating a configuration of the smartphone 200 illustrated in FIG. 15.

As illustrated in FIG. 16, the smartphone comprises, as main components, a wireless communication section 210, a display input section 204, a speech section 211, the operation sections 207, the camera section 208, a storage section 212, an external input/output section 213, a global positioning system (GPS) receiver 214, a motion sensor section 215, a power supply section 216, and a main controller 220.

As the main function of the smartphone 200, there is provided a wireless communication function for performing mobile wireless communication with a base station device BS, which is not illustrated, through a mobile communication network NW which is not illustrated.

The wireless communication section 210 performs wireless communication with the base station device BS, which is included in the mobile communication network NW, in accordance with an instruction of the main controller 220. The wireless communication is used to transmit and receive various kinds of file data such as audio data and image data, and e-mail data or to receive web data, streaming data, or the like.

The display input section 204 is a so-called touch panel, and includes the display panel 202 and the operation panel 203. The touch panel displays image (still image and moving image) information, text information, or the like so as to visually transfer the information to a user in accordance with control of the main controller 220, and detects a user operation on the displayed information.

The display panel 202 uses a liquid crystal display (LCD), an organic electro-luminescence display (OELD), or the like as a display device.

The operation panel 203 is a device that is provided for viewing an image which is displayed on a display screen of the display panel 202 and that detects a single pair of coordinates or a plurality of pairs of coordinates at which an operation is performed by a user's finger or a stylus. In a case where such a device is operated by a user's finger or a stylus, the device outputs a detection signal, which is generated due to the operation, to the main controller 220. Subsequently, the main controller 220 detects an operation position (coordinates) on the display panel 202, on the basis of the received detection signal.

As illustrated in FIG. 16, the display panel 202 and the operation panel 203 of the smartphone 200, which is exemplified as the imaging apparatus according to the above-mentioned embodiment of the present invention, are integrated to compose the display input section 204, and are disposed such that the operation panel 203 completely covers the display panel 202.

In a case where such an arrangement is adopted, the operation panel 203 may have a function of also detecting a user operation in a region other than the display panel 202. In other words, the operation panel 203 may comprise a detection region (hereinafter referred to as a display region) for a part which overlaps with the display panel 202 and a detection region (hereinafter referred to as a non-display region) for the other part at the outer edge which does not overlap with the display panel 202.

It should be noted that a size of the display region and a size of the display panel 202 may completely coincide with each other, but it is not always necessary for both to coincide with each other. Further, the operation panel 203 may include two sensing regions of the outer edge part and the other inside part. A width of the outer edge part is appropriately designed depending on a size of the housing 201 and the like.

In addition, examples of the position detection method adopted for the operation panel 203 may include a matrix switch method, a resistance film method, a surface elastic wave method, an infrared method, an electromagnetic induction method, and an electrostatic capacitance method, and the like, and any method may be adopted.

The speech section 211 comprises a speaker 205 or a microphone 206. The speech section 211 converts a sound of a user, which is input through the microphone 206, into audio data, which can be processed in the main controller 220, and outputs the data to the main controller 220, or decodes audio data, which is received by the wireless communication section 210 or the external input/output section 213, and outputs the data from the speaker 205.

Further, as illustrated in FIG. 15, for example, the speaker 205 can be mounted on the same surface as the surface on which the display input section 204 is provided. In addition, the microphone 206 can be mounted on a side surface of the housing 201.

The operation section 207 is a hardware key using a key switch or the like, and receives an instruction from a user. For example, as illustrated in FIG. 15, the operation sections 207 are button type switches which are mounted on the side surface of the housing 201 of the smartphone 200. Each switch is turned on in a case where it is pressed by a finger or the like, and is turned off due to restoring force of a spring in a case where the finger is released.

The storage section 212 stores a control program and control data of the main controller 220, application software, address data in which names, phone numbers, or the like of communication partners are associated, received and transmitted e-mail data, web data which is downloaded by web browsing, and downloaded contents data, and temporarily stores streaming data and the like. Further, the storage section 212 is composed of an internal storage section 217, which is built into the smartphone, and a removable external storage section 218 which has an external memory slot.

In addition, each of the internal storage section 217 and the external storage section 218 composing the storage section 212 is implemented by using a storage medium such as a flash memory type, a hard disk type, a multimedia card micro type, a card type memory (such as a MicroSD (registered trademark) memory), a random access memory (RAM), or a read only memory (ROM).

The external input/output section 213 has a function of an interface with all external devices connected to the smartphone 200. The external input/output section 213 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 200 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, an earphone computer which is connected in a wired or wireless manner, and the like.

The external input/output section 213 is able to transfer the data, which is transmitted from such external devices, to the components within the smartphone 200, or to transmit the data within the smartphone 200 to the external devices.

The GPS receiver 214 receives a plurality of GPS signals, which are transmitted from GPS satellites ST1 to STn, in accordance with instructions of the main controller 220, executes positioning calculation processing based on the received GPS signals, and detects a position formed of a latitude, a longitude, and an altitude of the smartphone 200. The GPS receiver 214 may detect the position by using position information in a case where it is possible to acquire the position information from the wireless communication section 210 or the external input/output section 213 (for example, wireless LAN).

The motion sensor section 215 includes, for example, a triaxial acceleration sensor, and detects physical movement of the smartphone 200, in accordance with an instruction of the main controller 220. By detecting physical movement of the smartphone 200, an acceleration or a direction of the movement of the smartphone 200 is detected. Such a detection result is output to the main controller 220.

The power supply section 216 supplies the respective sections of the smartphone 200 with electric power, which is stored in a battery (not illustrated), in accordance with an instruction of the main controller 220.

The main controller 220 includes a micro processor, and integrally controls the respective sections of the smartphone 200 by performing an operation on the basis of control data and a control program stored in the storage section 212. Further, the main controller 220 has an application processing function and a mobile communication control function of controlling the respective sections of a communication system in order to perform data communication or sound communication through the wireless communication section 210.

The application processing function is implemented by an operation of the main controller 220 using application software stored in the storage section 212. Examples of the application processing function include: an infrared communication function of performing data communication with other devices by controlling the external input/output section 213; an e-mail function of transmitting and receiving e-mails; a web browsing function of browsing web pages; and the like.

Further, the main controller 220 has an image processing function of displaying a video on the display input section 204 and the like, on the basis of image data (still image and moving image data) such as received data or downloaded streaming data.

The image processing function means a function of causing the main controller 220 to decode the image data, apply image processing to the decoding result, and display an image on the display input section 204.

Further, the main controller 220 executes display control for the display panel 202 and operation detection control to detect the user operation through the operation sections 207 and the operation panel 203.

Through execution of the display control, the main controller 220 displays an icon for activating application software or a window for displaying a software key such as a scroll bar or creating an e-mail.

In addition, the scroll bar means a software key for receiving an instruction to move a display portion of an image on a large image which cannot be entirely illustrated in the display region of the display panel 202.

Further, through execution of the operation detection control, the main controller 220 detects the user operation performed through the operation section 207, receives an operation performed on the icon and a text input performed in an input field of the window through the operation panel 203, or receives a request to scroll a displayed image through the scroll bar.

Furthermore, the main controller 220 has a touch panel control function performed through execution of the operation detection control. The function determines whether the operation position of the operation panel 203 is in the overlapping part (display region) which overlaps with the display panel 202 or the other part (non-display region) at the outer edge which does not overlap with the display panel 202, and controls the display position of the software key or the sensing region of the operation panel 203.

In addition, the main controller 220 may detect a gesture operation performed on the operation panel 203, and may execute a preset function in response to the detected gesture operation.

The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 208 includes the constituent elements other than the external memory controller 20, the storage medium 21, the display controller 22, the display section 23, and the operation section 14 in the digital camera illustrated in FIG. 1.

The captured image data, which is generated by the camera section 208, can be stored in the storage section 212, or can be output through the external input/output section 213 or the wireless communication section 210.

In the smartphone 200 illustrated in FIG. 15, the camera section 208 is mounted on the same side as the display input section 204. However, the mounting position of the camera section 208 is not limited to this. The camera section 208 may be mounted on the rear side of the housing 201.

Further, the camera section 208 can be used in various functions of the smartphone 200. For example, the image acquired by the camera section 208 can be displayed on the display panel 202, or the image of the camera section 208 can be used as one of the operation input of the operation panel 203.

Further, in a case where the GPS receiver 214 detects a position, the GPS receiver 214 may detect the position with reference to an image obtained from the camera section 208. Furthermore, it may be possible to determine a direction of an optical axis of the camera section 208 of the smartphone 200 or determine a current user environment, using the GPS receiver 214 in a combination with the triaxial acceleration sensor or without using the triaxial acceleration sensor, with reference to the image acquired from the camera section 208. Needless to say, the image acquired from the camera section 208 may be used in the application software.

Otherwise, the position information acquired by the GPS receiver 214, the sound information acquired by the microphone 206 (or text information obtained through sound text conversion performed by the main controller or the like), posture information acquired by the motion sensor section 215, and the like may be added to the image data of the still image or the moving image, and the image data may be stored in the storage section 212, or may be output through the external input/output section 213 or the wireless communication section 210.

In the smartphone 200 configured as described above, focus bracket imaging unlikely to fail can be performed.

As described above, the present description discloses the following items.

(1)

An imaging apparatus comprising: an imager that performs imaging of a subject through an imaging optical system including a focus lens capable of changing a position of a principal point in a range between a first position and a second position in a direction of an optical axis; and an imaging controller that continuously performs a plurality of imaging control operations for causing the imager to perform imaging of the subject through the imaging optical system in a state where the principal point of the focus lens is set at each of a plurality of imaging positions which are set in a movement range as at least a partial range of the range, where the imaging controller makes distances between the plurality of imaging positions narrower in an imaging control operation performed later in time series among the plurality of imaging control operations.

(2)

The imaging apparatus according to (1), where the imaging controller sets a larger number of the plurality of imaging positions in the imaging control operation performed later in time series among the plurality of imaging control operations.

(3)

The imaging apparatus according to (1) or (2), where the plurality of imaging positions are a first imaging position, a second imaging position, and at least one third imaging position between the first imaging position and the second imaging position, and where in a case of performing the imaging control operation, the imaging controller sets the principal point of the focus lens at the third imaging position, performs first imaging through the imager, and thereafter performs imaging while setting the principal point of the focus lens alternately at an imaging position, which is set closer to the first imaging position than the third imaging position, and an imaging position which is set closer to the second imaging position than the third imaging position.

(4)

The imaging apparatus according to (3), where in a case of performing the imaging control operation, the imaging controller performs the first imaging, thereafter sets the principal point of the focus lens at the first imaging position, performs second imaging through the imager, thereafter sets the principal point of the focus lens at the second imaging position, performs third imaging through the imager, and thereafter performs imaging while setting the principal point of the focus lens alternately at an imaging position which is set closer to the first imaging position than the third imaging position, and at an imaging position which is set closer to the second imaging position than the third imaging position.

(5)

The imaging apparatus according to any one of (1) to (4), where the imaging optical system includes a stop, and where the imaging controller performs imaging of the subject by making an F number of the stop smaller as the distances between the plurality of imaging positions are narrower.

(6)

The imaging apparatus according to any one of (1) to (5), further comprising a motion detection section that detects a motion of the subject during imaging on the basis of captured image data obtained by the imaging control operation, where the imaging controller ends the imaging control operation in a case where the motion detection section detects the motion of the subject.

(7)

The imaging apparatus according to any one of (1) to (6), further comprising a display controller that causes a display section to display information based on the plurality of imaging positions which are set by the imaging controller in a case where the imaging control operation is performed.

(8)

The imaging apparatus according to any one of (1) to (7), further comprising a storage controller that stores, in a storage medium, captured image data obtained by the imaging control operation, in which the distances between the plurality of imaging positions are the narrowest, among the completed imaging control operations.

(9)

The imaging apparatus according to any one of (1) to (7), further comprising a storage controller that stores all pieces of the captured image data obtained by the imaging control operations in a storage medium.

(10)

The imaging apparatus according to (9), further comprising an image processing section that combines all the pieces of the captured image data to generate depth composition image data.

(11)

The imaging apparatus according to (9) or (10), where all the imaging positions, which are set in the movement range, are different in each of the plurality of imaging control operations.

(12)

An imaging method using an imager that performs imaging of a subject through an imaging optical system including a focus lens capable of changing a position of a principal point in a range between a first position and a second position in a direction of an optical axis, the imaging method comprising an imaging control step of continuously performing a plurality of imaging control operations for causing the imager to perform imaging of the subject through the imaging optical system in a state where the principal point of the focus lens is set at each of a plurality of imaging positions which are set in a movement range as at least a partial range of the range, where in the imaging control step, distances between the plurality of imaging positions are made to be narrower in an imaging control operation performed later in time series among the plurality of imaging control operations.

(13)

The imaging method according to (12), where in the imaging control step, a larger number of the plurality of imaging positions is set in the imaging control operation performed later in time series among the plurality of imaging control operations.

(14)

The imaging method according to (12) or (13), where the plurality of imaging positions are a first imaging position, a second imaging position, and at least one third imaging position between the first imaging position and the second imaging position, and where in the imaging control step, in a case of performing the imaging control operation, the principal point of the focus lens is set at the third imaging position, first imaging is performed through the imager, and thereafter imaging is performed while the principal point of the focus lens is set alternately at an imaging position, which is set closer to the first imaging position than the third imaging position, and an imaging position which is set closer to the second imaging position than the third imaging position.

(15)

The imaging method according to (14), where in the imaging control step, in a case of performing the imaging control operation, the first imaging is performed, thereafter the principal point of the focus lens is set at the first imaging position, second imaging is performed through the imager, thereafter the principal point of the focus lens is set at the second imaging position, third imaging is performed through the imager, and thereafter imaging is performed while the principal point of the focus lens is set alternately at an imaging position which is set closer to the first imaging position than the third imaging position, and at an imaging position which is set closer to the second imaging position than the third imaging position.

(16)

The imaging method according to any one of (12) to (15), where the imaging optical system includes a stop, and where in the imaging control step, imaging of the subject is performed by making an F number of the stop smaller as the distances between the plurality of imaging positions are narrower.

(17)

The imaging method according to any one of (12) to (16), further comprising a motion detection step of detecting a motion of the subject during imaging on the basis of captured image data obtained by the imaging control operation, where in the imaging control step, the imaging control operation ends in a case where the motion of the subject is detected in the motion detection step.

(18)

The imaging method according to any one of (12) to (17), further comprising a display control step of causing a display section to display information based on the plurality of imaging positions which are set in the imaging control step in a case where the imaging control operation is performed.

(19)

The imaging method according to any one of (12) to (18), further comprising a storage control step of storing, in a storage medium, captured image data obtained by the imaging control operation, in which the distances between the plurality of imaging positions are the narrowest, among the completed imaging control operations.

(20)

The imaging method according to any one of (12) to (18), further comprising a storage control step of storing all pieces of the captured image data obtained by the imaging control operations in a storage medium.

(21)

The imaging method according to (20), further comprising an image processing step of combining all the pieces of the captured image data to generate depth composition image data.

(22)

The imaging method according to (20) or (21), where all the imaging positions, which are set in the movement range, are different in each of the plurality of imaging control operations.

(23)

An imaging program causing a computer to execute an imaging method using an imager that performs imaging of a subject through an imaging optical system including a focus lens capable of changing a position of a principal point in a range between a first position and a second position in a direction of an optical axis, where the imaging method includes an imaging control step of continuously performing a plurality of imaging control operations for causing the imager to perform imaging of the subject through the imaging optical system in a state where the principal point of the focus lens is set at each of a plurality of imaging positions which are set in a movement range as at least a partial range of the range, and where in the imaging control step, distances between the plurality of imaging positions are made to be narrower in an imaging control operation performed later in time series among the plurality of imaging control operations.

According to the present invention, it is possible to provide an imaging apparatus, an imaging method, and an imaging program capable of reducing the possibility of imaging failure in the focus bracketing mode.

The present invention has been hitherto described with reference to the specific embodiments. However, the present invention is not limited to the embodiments, and may be modified into various forms without departing from the technical scope of the present invention.

This application is on the basis of Japanese Patent Application (JP2017-050270A) filed on Mar. 15, 2017, the content of which is incorporated herein by reference.

EXPLANATION OF REFERENCES

1: imaging lens
2: stop
4: lens controller
5: imager
6: analog signal processing section
7: analog digital conversion circuit
8: lens driving section
9: stop driving section
10: imager driving section
11: system controller
11A: imaging controller
11B: storage controller
11C: motion detection section
11D: display controller
14: operation section
15: memory controller
16: main memory
17: digital signal processing section
17A: image processing section
20: external memory controller
21: storage medium
22: display controller
23: display section
24: control bus
25: data bus
40: lens device
LV: live view image
H: insect
AF1, AF2: area
A1: movable range
A2: movement range
P1, P2: imaging position
1a to 3a: imaging position
p1, p2: imaging position
1b to 6b: imaging position
1c to 13c: imaging position
23A, 23B: image
200: smartphone
201: housing
202: display panel
203: operation Panel
204: display input section
205: speaker
206: microphone
207: operation section
208: camera section
210: wireless communication section
211: speech section
212: storage section
213: external input/output section
214: GPS receiving section
215: motion sensor section
216: power supply section
217: internal storage section 218: external storage section
220: main controller
ST1 to STn: GPS satellite

What is claimed is:

1. An imaging apparatus comprising:
an imager that performs imaging of a subject through an imaging optical system including a focus lens capable of changing a position of a principal point in a range between a first position and a second position in a direction of an optical axis; and
an imaging controller that continuously performs a plurality of imaging control operations for causing the imager to perform imaging of the subject through the imaging optical system in a state where the principal point of the focus lens is set at each of a plurality of imaging positions which are set in a movement range as at least a partial range of the range,
wherein the imaging controller makes distances between the plurality of imaging positions narrower and sets a larger number of the plurality of imaging positions in an imaging control operation performed later in time series among the plurality of imaging control operations.

2. The imaging apparatus according to claim 1,
wherein the plurality of imaging positions are a first imaging position, a second imaging position, and at least one third imaging position between the first imaging position and the second imaging position, and
wherein in a case of performing the imaging control operation, the imaging controller sets the principal point of the focus lens at the third imaging position, performs first imaging through the imager, and thereafter performs imaging while setting the principal point of the focus lens alternately at an imaging position which is set closer to the first imaging position than the third imaging position, and at an imaging position which is set closer to the second imaging position than the third imaging position.

3. The imaging apparatus according to claim 2,
wherein in a case of performing the imaging control operation, the imaging controller performs the first imaging, thereafter sets the principal point of the focus lens at the first imaging position, performs second imaging through the imager, thereafter sets the principal point of the focus lens at the second imaging position, performs third imaging through the imager, and thereafter performs imaging while setting the principal point of the focus lens alternately at an imaging position which is set closer to the first imaging position than the third imaging position, and at an imaging position which is set closer to the second imaging position than the third imaging position.

4. The imaging apparatus according to claim 1,
wherein the imaging optical system includes a stop, and
wherein the imaging controller performs imaging of the subject by making an F number of the stop smaller as the distances between the plurality of imaging positions are narrower.

5. The imaging apparatus according to claim 1, further comprising
a motion detection section that detects a motion of the subject during imaging based on captured image data obtained by the imaging control operation,
wherein the imaging controller ends the imaging control operation in a case where the motion detection section detects the motion of the subject.

6. The imaging apparatus according to claim 1, further comprising
a display controller that causes a display section to display information based on the plurality of imaging positions which are set by the imaging controller in a case where the imaging control operation is performed.

7. The imaging apparatus according to claim 1, further comprising
a storage controller that stores, in a storage medium, captured image data obtained by the imaging control operation, in which the distances between the plurality of imaging positions are narrowest, among the completed imaging control operations.

8. The imaging apparatus according to claim 1, further comprising
a storage controller that stores all pieces of the captured image data obtained by the imaging control operations in a storage medium.

9. The imaging apparatus according to claim 8, further comprising
an image processing section that combines all the pieces of the captured image data to generate depth composition image data.

10. The imaging apparatus according to claim 8,
wherein all the imaging positions, which are set in the movement range, are different in each of the plurality of imaging control operations.

11. An imaging method using an imager that performs imaging of a subject through an imaging optical system including a focus lens capable of changing a position of a principal point in a range between a first position and a second position in a direction of an optical axis, the imaging method comprising
an imaging control step of continuously performing a plurality of imaging control operations for causing the imager to perform imaging of the subject through the imaging optical system in a state where the principal point of the focus lens is set at each of a plurality of imaging positions which are set in a movement range as at least a partial range of the range,
wherein in the imaging control step, distances between the plurality of imaging positions are made to be narrower and a larger number of the plurality of imaging positions is set in an imaging control operation performed later in time series among the plurality of imaging control operations.

12. The imaging method according to claim 11,
wherein the plurality of imaging positions are a first imaging position, a second imaging position, and at least one third imaging position between the first imaging position and the second imaging position, and
wherein in the imaging control step, in a case of performing the imaging control operation, the principal point of the focus lens is set at the third imaging position, first imaging is performed through the imager, and thereafter imaging is performed while the principal point of the focus lens is set alternately at an imaging position which is set closer to the first imaging position than the third imaging position, and at an imaging position which is set closer to the second imaging position than the third imaging position.

13. The imaging method according to claim 12,
wherein in the imaging control step, in a case of performing the imaging control operation, the first imaging is performed, thereafter the principal point of the focus lens is set at the first imaging position, second imaging is performed through the imager, thereafter the principal point of the focus lens is set at the second imaging position, third imaging is performed through the imager, and thereafter imaging is performed while the principal point of the focus lens is set alternately at an imaging position which is set closer to the first imaging position than the third imaging position, and at an imaging position which is set closer to the second imaging position than the third imaging position.

14. The imaging method according to claim 11,
wherein the imaging optical system includes a stop, and
wherein in the imaging control step, imaging of the subject is performed by making an F number of the stop smaller as the distances between the plurality of imaging positions are narrower.

15. The imaging method according to claim 11, further comprising
a motion detection step of detecting a motion of the subject during imaging based on captured image data obtained by the imaging control operation,
wherein in the imaging control step, the imaging control operation ends in a case where the motion of the subject is detected in the motion detection step.

16. The imaging method according to claim 11, further comprising
a display control step of causing a display section to display information based on the plurality of imaging positions which are set in the imaging control step in a case where the imaging control operation is performed.

17. The imaging method according to claim 11, further comprising
a storage control step of storing, in a storage medium, captured image data obtained by the imaging control operation, in which the distances between the plurality of imaging positions are narrowest, among the completed imaging control operations.

18. The imaging method according to claim 11, further comprising
a storage control step of storing all pieces of the captured image data obtained by the imaging control operations in a storage medium.

19. The imaging method according to claim 18, further comprising
an image processing step of combining all the pieces of the captured image data to generate depth composition image data.

20. The imaging method according to claim 18,
wherein all the imaging positions, which are set in the movement range, are different in each of the plurality of imaging control operations.

21. A non-transitory computer readable medium storing an imaging program causing a computer to execute an imaging method using an imager that performs imaging of a subject through an imaging optical system including a focus lens capable of changing a position of a principal point in a range between a first position and a second position in a direction of an optical axis,
wherein the imaging method includes an imaging control step of continuously performing a plurality of imaging control operations for causing the imager to perform imaging of the subject through the imaging optical system in a state where the principal point of the focus lens is set at each of a plurality of imaging positions which are set in a movement range as at least a partial range of the range, and
wherein in the imaging control step, distances between the plurality of imaging positions are made to be narrower and a larger number of the plurality of imaging positions is set in an imaging control operation performed later in time series among the plurality of imaging control operations.

* * * * *